(12) United States Patent
Joo et al.

(10) Patent No.: US 10,459,277 B2
(45) Date of Patent: Oct. 29, 2019

(54) DISPLAY DEVICE

(71) Applicant: Samsung Display Co., Ltd., Yongin-Si, Gyeonggi-do (KR)

(72) Inventors: Sun Kyu Joo, Suwon-si (KR); Su Jeong Kim, Yongin-si (KR); Jang Wi Ryu, Seoul (KR); Yi Seop Shim, Suwon-si (KR); Keun Chan Oh, Hwaseong-si (KR); Jae Jin Lyu, Yongin-si (KR); Jun Woo Lee, Seongnam-si (KR); Chang Soon Jang, Seoul (KR); Young Bong Cho, Seongnam-si (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 95 days.

(21) Appl. No.: 15/638,689

(22) Filed: Jun. 30, 2017

(65) Prior Publication Data
US 2018/0088403 A1 Mar. 29, 2018

(30) Foreign Application Priority Data

Sep. 29, 2016 (KR) .......................... 10-2016-0125797
Feb. 2, 2017 (KR) .......................... 10-2017-0014759

(51) Int. Cl.
*G02F 1/1335* (2006.01)
*G02F 1/01* (2006.01)
(Continued)

(52) U.S. Cl.
CPC ...... *G02F 1/133514* (2013.01); *G02F 1/0136* (2013.01); *G02F 1/13394* (2013.01);
(Continued)

(58) Field of Classification Search
CPC ........... G02F 1/133514; G02F 1/13394; G02F 2001/136222; G02F 1/136209
See application file for complete search history.

(56) References Cited

U.S. PATENT DOCUMENTS 6,577,374 B1 6/2003 Nakata et al.
9,482,907 B2 11/2016 Kwak et al.
(Continued)

FOREIGN PATENT DOCUMENTS

JP  2002-258267 A  9/2002
JP  2006267524 A * 10/2006
(Continued)

OTHER PUBLICATIONS

Extended European Search Report corresponding to EP Application No. 17184053.1, dated Feb. 28, 2018, 10 pages.

*Primary Examiner* — Alexander P Gross
(74) *Attorney, Agent, or Firm* — Innovation Counsel LLP

(57) ABSTRACT

A display device includes a base portion including a pixel area including a light-transmitting area and a light-blocking area; a projection portion disposed on the light-blocking area of the base portion and including a first sub-color filter and a second sub-color filter overlapping over an overlap area; a light-blocking member disposed on the projection portion and overlapping the base portion; and a spacing member disposed on the light-blocking member, made of the same material as the light-blocking member and overlapping the projection portion. The first sub-color filter includes a first color pigment, the second sub-color filter includes a second color pigment different from the first color pigment, a first width of the first sub-color filter in a first direction is different from a second width of the second sub-color filter in the first direction, a third width of the first sub-color filter in a second direction is different from a fourth width of the (Continued)

second sub-color filter in the second direction, and the second direction is a direction intersecting the first direction.

24 Claims, 44 Drawing Sheets

(51) Int. Cl.
*G02F 1/1337* (2006.01)
*G02F 1/1339* (2006.01)
*G02F 1/1362* (2006.01)
*G02F 1/13* (2006.01)
*G02F 1/135* (2006.01)

(52) U.S. Cl.
CPC .. *G02F 1/133707* (2013.01); *G02F 1/136209* (2013.01); *G02F 1/13* (2013.01); *G02F 2001/1351* (2013.01); *G02F 2001/13396* (2013.01); *G02F 2001/136222* (2013.01)

(56) References Cited

U.S. PATENT DOCUMENTS

| | | | |
|---|---|---|---|
| 2003/0156236 A1* | 8/2003 | Yamada | G02F 1/13394 349/106 |
| 2010/0265439 A1* | 10/2010 | Ishitobi | G02B 5/201 349/106 |
| 2015/0092138 A1 | 4/2015 | Kwak et al. | |
| 2016/0132154 A1 | 5/2016 | Lee et al. | |
| 2016/0202528 A1 | 7/2016 | Kang et al. | |
| 2018/0120630 A1* | 5/2018 | Teruhira | G02F 1/133514 |

FOREIGN PATENT DOCUMENTS

| | | |
|---|---|---|
| KR | 10-2015-0039002 A | 4/2015 |
| KR | 10-2015-0043097 A | 4/2015 |

* cited by examiner (a)          (b)

FIG. 25
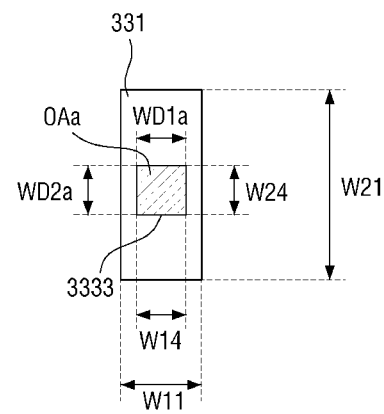
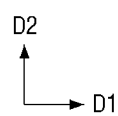
FIG. 26
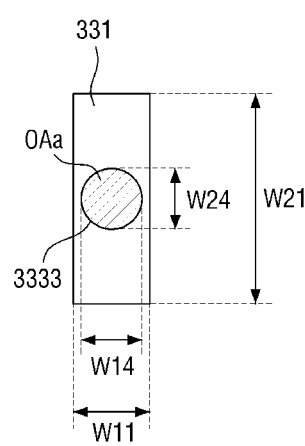
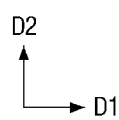

DISPLAY DEVICE

This application claims priority from Korean Patent Application No. 10-2016-0125797 filed on Sep. 29, 2016 and Korean Patent Application No. 10-2017-0014759 filed on Feb. 2, 2017 in the Korean Intellectual Property Office, the disclosures of which are incorporated herein by reference in their entirety.

BACKGROUND

1. Field of the Invention

The present disclosure relates to a display device.

2. Description of the Related Art

Among display devices, a liquid crystal display device is one of the most widely used flat panel display devices. A typical liquid crystal display includes electric field generating electrodes such as a pixel electrode and a common electrode and a liquid crystal layer filling a gap between two substrates. A voltage is applied to two electric field generating electrodes to form an electric field in the liquid crystal layer, thereby determining the alignment of liquid crystal molecules and controlling the polarization of incident light to display an image.

In the case of the aforementioned liquid crystal display device, a light-blocking member is formed to prevent light leakage, and a spacing member is formed to uniformly maintain the liquid crystal layer gap between the two substrates.

SUMMARY

In a conventional process of forming a light-blocking member of a liquid crystal display device, a mask is required. Further, an additional mask is required to form a spacing member increasing the manufacturing cost of a liquid crystal display device as the number of masks increases in the manufacturing process.

The present disclosure provides a display device in which a light-blocking member and a spacing member are formed to have different steps.

However, the present disclosure is not restricted to the one set forth herein. The above and other aspects of the present disclosure will become more apparent to one of ordinary skill in the art to which the present disclosure pertains by referencing the detailed description of the present disclosure given below.

According to an aspect of the present inventive concept, a display device includes a base portion including a pixel area that includes a light-transmitting area and a light-blocking area; a projection portion disposed on the light-blocking area of the base portion, the projection portion including a first sub-color filter and a second sub-color filter overlapping the first sub-color filter over an overlap area; a light-blocking member disposed on the projection portion and overlapping the base portion; and a spacing member disposed on the light-blocking member, the spacing member being made of the same material as the light-blocking member and overlapping the projection portion, wherein the first sub-color filter includes a first color pigment, the second sub-color filter includes a second color pigment different from the first color pigment, a first width of the first sub-color filter in a first direction is different from a second width of the second sub-color filter in the first direction, a third width of the first sub-color filter in a second direction is different from a fourth width of the second sub-color filter in the second direction, and the second direction is a direction intersecting the first direction.

According to an aspect of the present inventive concept, a display device includes a base portion including a first pixel area that includes a first light-transmitting area and a first light-blocking area and a second pixel area that includes a second light-transmitting area and a second light-blocking area; a projection portion disposed on the first light-blocking area of the base portion, the projection portion including a first sub-color filter and a second sub-color filter overlapping the first sub-color filter over an overlap area; a third sub-color filter disposed on the second light-blocking area of the base portion; a first light-blocking member disposed on the projection portion and overlapping the first light-blocking area of the base portion; a second light-blocking member disposed on the third sub-color filter and overlapping the second light-blocking area of the base portion; a spacing member disposed on the first light-blocking member, the spacing member being made of the same material as the first light-blocking member and overlapping the projection portion; and a subsidiary spacing member disposed on the second light-blocking member, the subsidiary spacing member being made of the same material as the second light-blocking member and overlapping the third sub-color filter, wherein the first sub-color filter includes a first color pigment, the second sub-color filter includes a second color pigment different from the first color pigment, a first width of the first sub-color filter in a first direction is different from a second width of the second sub-color filter in the first direction, a third width of the first sub-color filter in a second direction is different from a fourth width of the second sub-color filter in the second direction, and the second direction is a direction intersecting the first direction.

BRIEF DESCRIPTION OF THE DRAWINGS

The above and other aspects and features of the present disclosure will become more apparent by describing in detail exemplary embodiments thereof with reference to the attached drawings, in which:

FIG. 25 is a plan view of the projection portion shown in FIG. 24;

FIGS. 26 to 40 are plan views showing modified examples of the projection portion shown in FIG. 25;

DETAILED DESCRIPTION OF THE EMBODIMENTS

Figure 1:
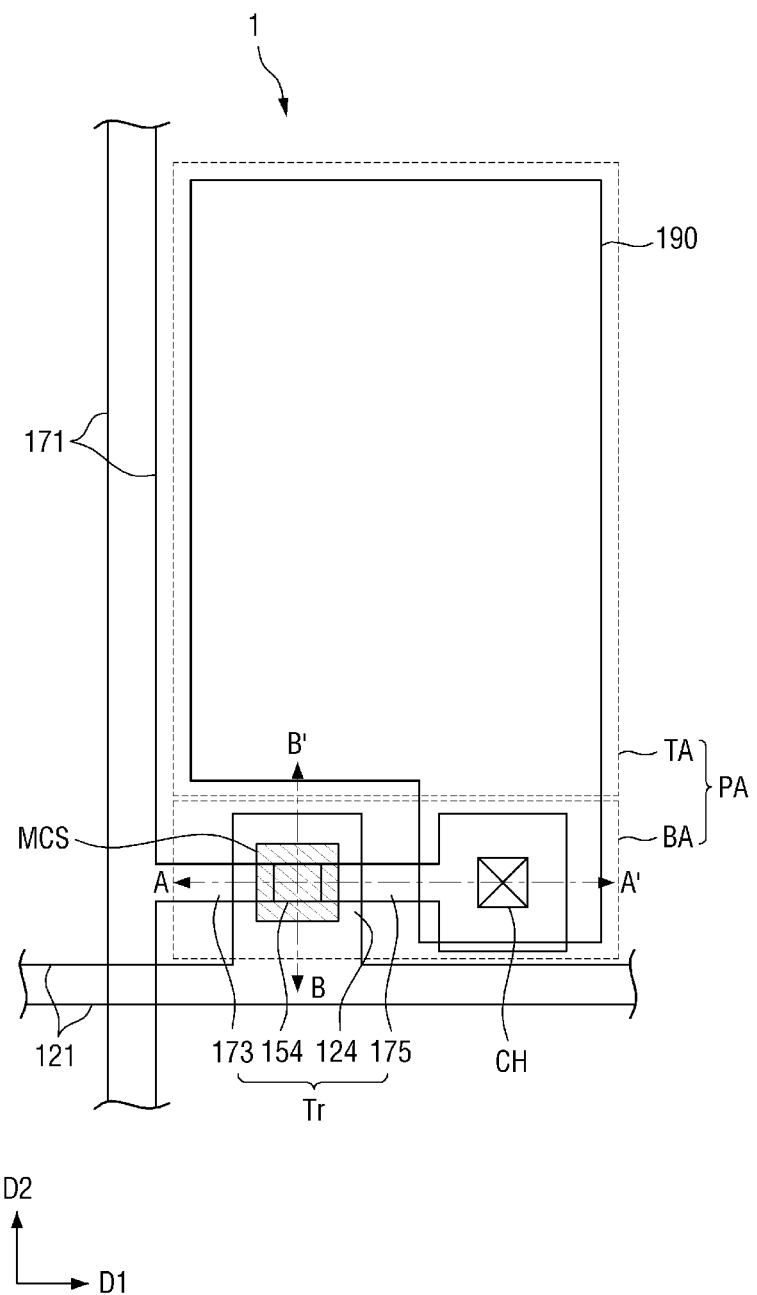
FIG. 1 is an exemplary plan view of one pixel of a display device according to an embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art. Like reference numerals may refer to like elements throughout the specification.

The terminology used herein is for the purpose of describing particular embodiments and is not intended to be limiting of the present disclosure. As used herein, the singular forms "a", "an" and "the" are intended to include the plural forms as well, unless the context clearly indicates otherwise. It will be further understood that the terms "comprise" and/or "comprising," when used in this specification, specify the presence of one or more of the stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected, or coupled to the other element or layer or one or more intervening elements or layers may be present. In contrast, when an element is referred to as being "directly on", "directly connected to," or "directly coupled to" another element or layer, there may be no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. Instead, these terms are used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations), and the spatially relative descriptors used herein may be interpreted accordingly.

Unless otherwise defined, terms (including technical and scientific terms) used herein would have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein illustrate a case where the display device is a display device of a vertical alignment mode, and the case is shown in the drawings, but the present disclosure is not limited thereto. Besides, the present disclosure may be applied to various display devices, such as a display device of a patterned vertical alignment (PVA) mode, an in-plane switching (IPS) type display device, a plane-line switching (PLS) type display device, a fringe-field switching (FFS) type display device, a twisted nematic (TN) display device, and other electrically-controlled birefingence (ECB) type display devices.

Further, embodiments described herein illustrate a case where the display device has a common electrode on-top configuration, and the case is shown in the drawings, but the present disclosure is not limited thereto. Besides, the present disclosure may also be applied to a display device having a common electrode on-bottom configuration.

The same reference numerals may be used for the same or similar components throughout the present disclosure.

Hereinafter, preferred embodiments of the present disclosure will be described with reference to the attached drawings.

Figure 2:
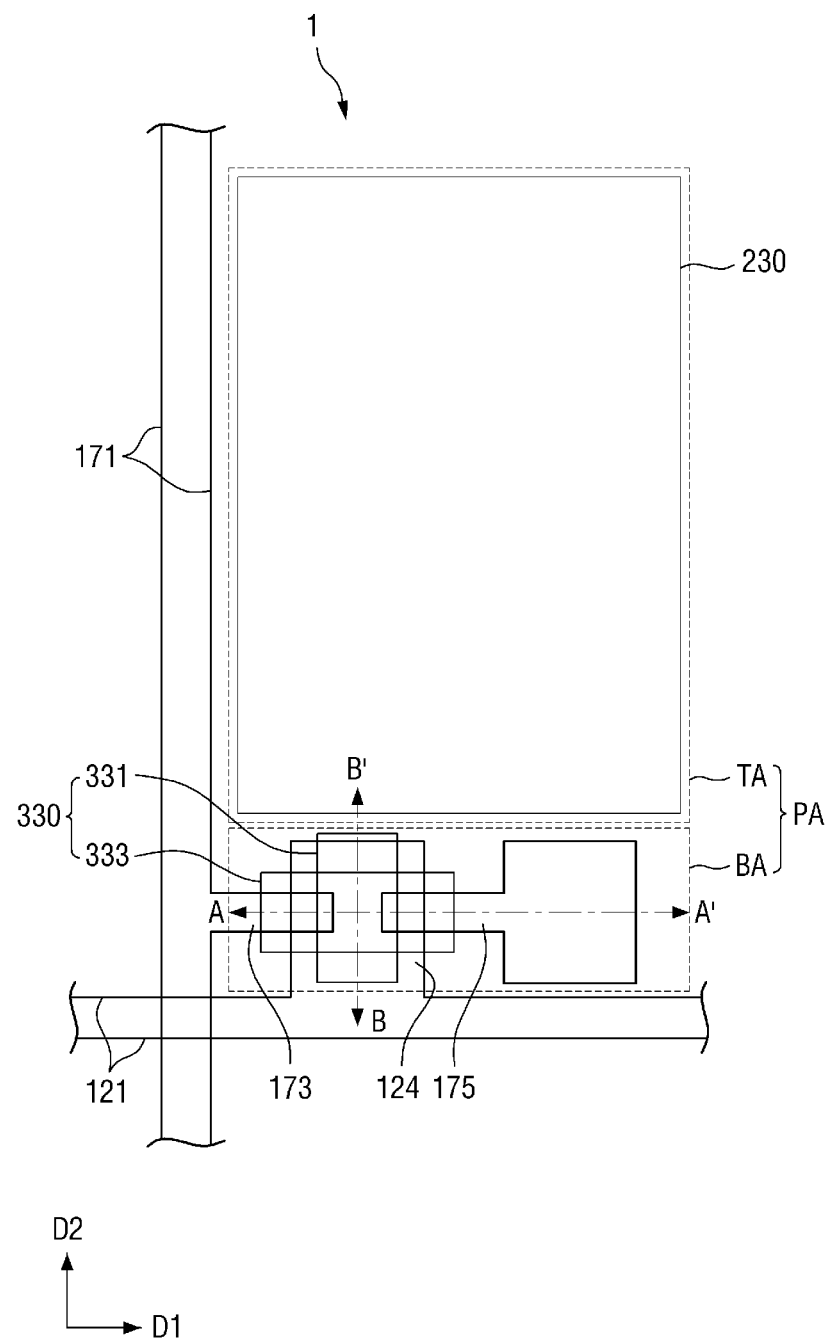
FIG. 2 is a plan view schematically showing the arrangement relationship among a color filter, a projection portion, a gate line, and a data line in the display device shown in FIG. 1.
Figure 3:
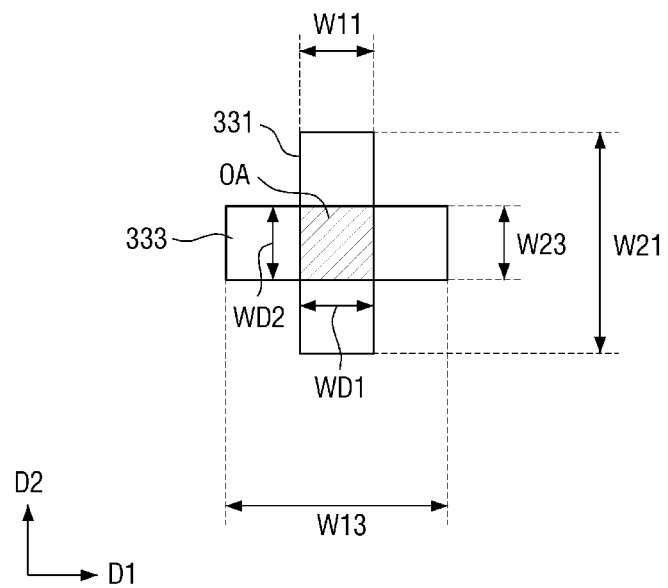
FIG. 3 is a plan view of the projection portion shown in FIG. 2.
Figure 4:
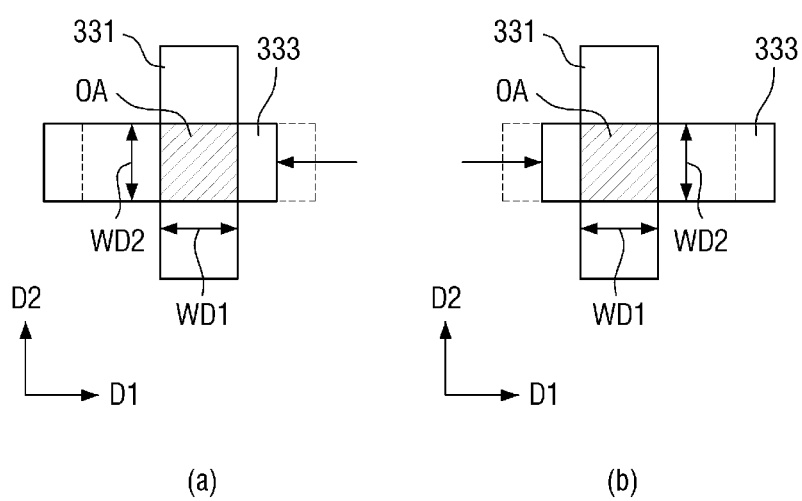
FIGS. 4 and 5 are plan views showing modified examples of the projection portion shown in FIG. 3.
Figure 5:
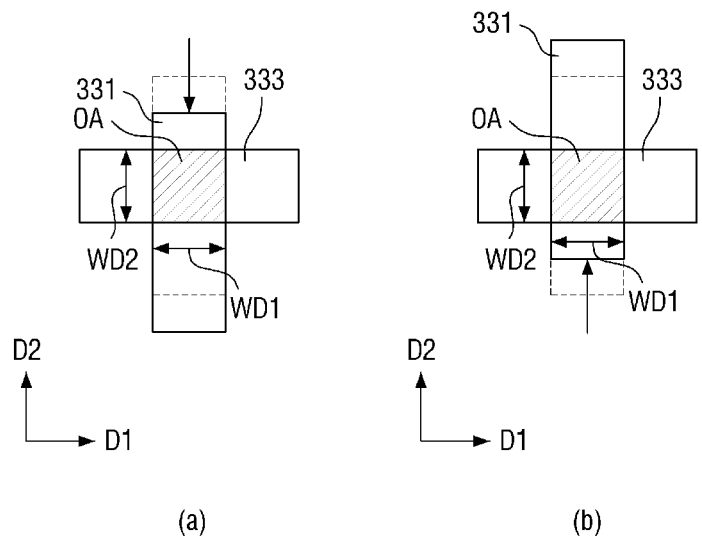
Figure 15:
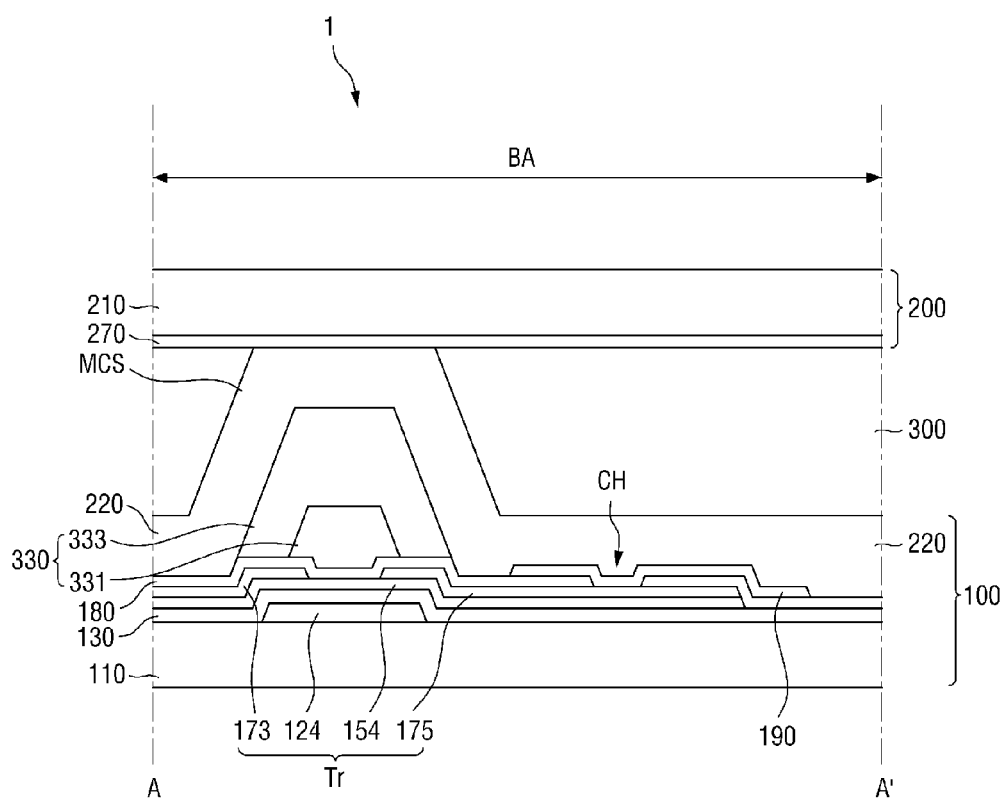
FIG. 15 is a sectional view of the display device taken along the line A-A' of FIG. 1.
Figure 16:
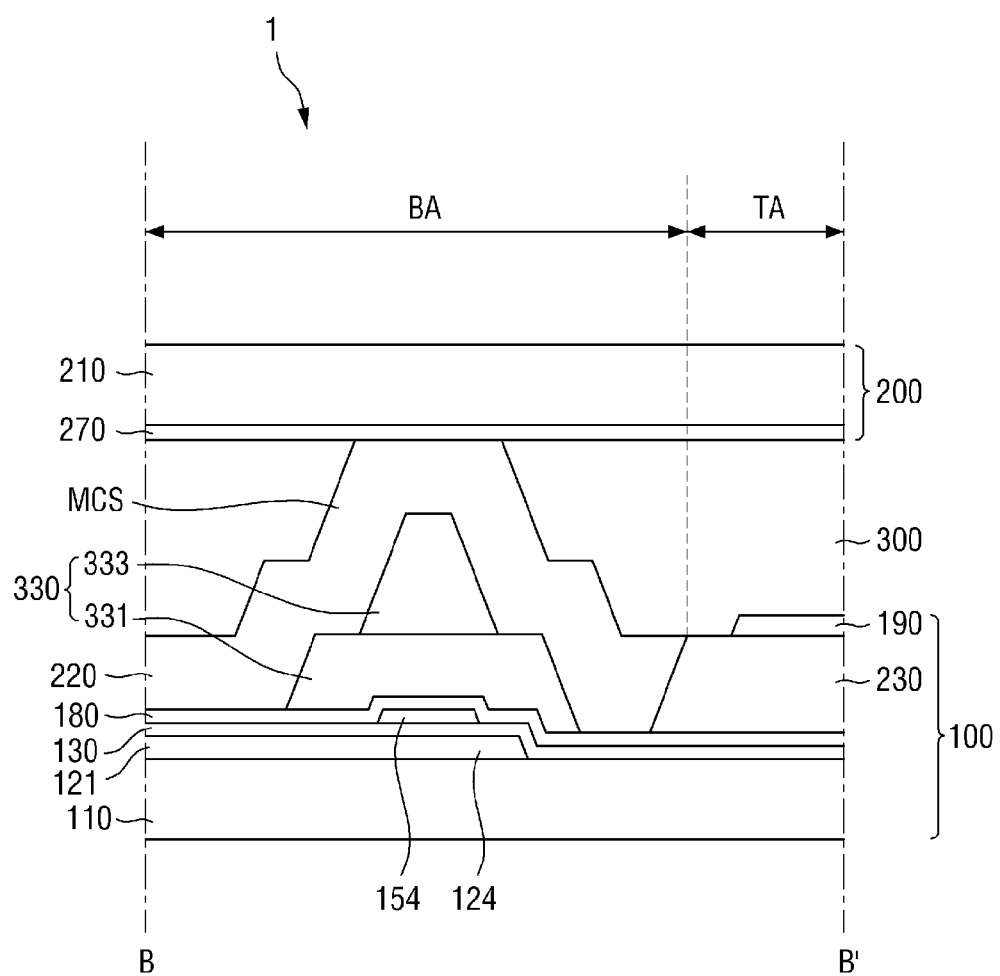
FIG. 16 is a sectional view of the display device taken along the line B-B' of FIG. 1.

FIG. 1 is an exemplary plan view of one pixel of a display device according to an embodiment of the present disclosure; FIG. 2 is a plan view schematically showing the arrangement relationship among a color filter, a projection portion, a gate line, and a data line in the display device shown in FIG. 1; FIG. 3 is a plan view of the projection portion shown in FIG. 2; FIGS. 4 and 5 are plan views showing modified examples of the projection portion shown in FIG. 3; FIGS. 6 to 14 are plan views showing other modified examples of the projection portion shown in FIG. 3; FIG. 15 is a sectional view of the display device taken along the line A-A' of FIG. 1; and FIG. 16 is a sectional view of the display device taken along the line B-B' of FIG. 1.

Referring to FIGS. 1 to 16, a display device 1 according to this embodiment may include a first display substrate 100, a second display substrate 200 facing the first display substrate 100, and a liquid crystal layer 300 disposed between the first display substrate 100 and the second display substrate 200. The display device 1 may further include a polarization unit. The polarization unit may be included in any one of the first display substrate 100 and the second display substrate 200. The polarizing unit may be provided separately from any one of the first display substrate 100 and the second display substrate 200.

The first display substrate 100 may be a thin film transistor substrate provided with one or more switching elements for driving liquid crystal molecules in the liquid crystal layer 300, for example, one or more thin film transistors.

The second display substrate 200 may be a substrate facing the first display substrate 100.

Hereinafter, the first display substrate 100 will be described.

The first display substrate 100 may include a first base portion 110. The first base portion 110 may be an insulation plate, and the insulation plate may be transparent. For example, the first base portion 110 may be made of glass, quartz, or transparent resin. Further, the first base portion 110 may contain a polymer or plastic having high heat resistance. In some embodiments, the first base portion 110 may have flexibility. That is, the first base portion 110 may be a plate that can be deformed by rolling, folding, bending, or the like.

The first base portion 110 may include a pixel area PA. The pixel area PA may be an area where a pixel for displaying an image is located. The pixel area PA may include a light-transmitting area TA and a light-blocking area BA. In the pixel area PA, a pixel electrode 190 to be described later may be disposed on the light-transmitting area TA, and a switching element to be described later may be disposed on the light-blocking area BA. Illustratively, the switching element may be a thin film transistor Tr.

A gate line 121 and a gate electrode 124 may be disposed on the first base portion 110. The gate line 121 may transmit a gate signal and may extend in one direction. Hereinafter, for convenience of explanation, a case where the gate line 121 extends in the horizontal direction or the first direction (D1 direction) will be described as an example. The gate electrode 124 may protrude from the gate line 121, and may be connected with the gate line 121. In some embodiments, each of the gate line 121 and the gate electrode 124 may contain an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), or titanium (Ti).

A gate insulation film 130 may be disposed on the gate line 121 and the gate electrode 124. The gate insulation film 130 may be made of an insulation material, for example, silicon nitride, silicon oxide, silicon oxynitride, or the like. The gate insulation film 130 may have a single-layer structure or a multi-layer structure including at least two insulation layers having different physical properties.

A semiconductor layer 154 may be disposed on the gate insulation film 130, and at least a part of the semiconductor layer 154 may overlap the gate electrode 124. The semiconductor 154 may contain amorphous silicon, polycrystalline silicon, or oxide semiconductor.

A data line 171 may be insulated from the gate line 121, and may extend in a direction intersecting the gate line 121. Hereinafter, for convenience of explanation, a case where the data line 171 extends in the longitudinal direction or the second direction (D2 direction) will be described as an example. The data line 171 may intersect the gate line 121 to define the pixel area PA.

A source electrode 173 may be connected to the data line 171, and may overlap the gate electrode 124. In some embodiments, the source electrode 173, as shown in FIGS. 1 and 2, may protrude from the data line 171 to overlap the gate electrode 124, but the present disclosure is not limited thereto. In some other embodiments, the source electrode 173 may be located on the same line as the data line 171.

A drain electrode 175 may be spaced apart from the source electrode 173 on the gate electrode 124, and may be disposed to face the source electrode 173. The drain electrode 175 may include a bar portion extending generally in parallel with the source electrode 173 and an extension portion located opposite to the bar portion.

In some embodiments, each of the data line 171, the source electrode 173, and the drain electrode 175 may be made of aluminum, copper, silver, molybdenum, chromium, titanium, tantalum, or an alloy thereof.

The gate electrode 124, the source electrode 173, and the drain electrode 175, and the semiconductor layer 154 may form a switching element, for example, a thin film transistor (Tr). The thin film transistor Tr may be disposed on the light-blocking area BA in the pixel area PA.

A passivation layer 180 may be disposed on the gate insulation layer 130, the semiconductor layer 154, the source electrode 173, and the drain electrode 175. The passivation layer 180 may contain an inorganic insulation material such as silicon oxide, silicon nitride, silicon oxynitride, or the like. The passivation layer 180 may protect the thin film transistor Tr, and may prevent the material contained in a color filter 230, which will be described later, from flowing into the semiconductor layer 154.

The passivation layer 180 may be provided with a contact hole CH exposing a part of the drain electrode 175, and the contact hole CH may be disposed to overlap the light-blocking area BA.

A color filter 230 may be disposed on the passivation layer 180. The color filter 230 may be disposed to overlap the light-transmitting area TA. In some embodiments, an edge portion of the color filter 230 may overlap the light-blocking area BA. Further, in some embodiments, the color filter 230 may not overlap the contact hole CH. The color filter 230 may be made of a photosensitive organic insulation material, and may further contain a color pigment. In an exemplary embodiment, the color pigment may be any one of a red pigment, a green pigment, and a blue pigment capable of exhibiting three primary colors. However, the color pigment is not limited thereto, and may include other primary colors, for example, magenta, cyan and yellow.

A pixel electrode 190 may be disposed on the color filter 230. The pixel electrode 190 may be disposed to overlap the light-transmitting area TA in the pixel area PA. A part of the pixel electrode 190 may extend to overlap a portion of the light-blocking area BA, so as to be physically and electrically connected with the drain electrode 175 through the contact hole 185. The pixel electrode 190 may receive a voltage from the drain electrode 175.

The pixel electrode 190 may be made of a transparent conductive material, such as ITO, IZO, ITZO, or AZO.

A projection portion 330 may be disposed on the passivation layer 180. The projection portion 330 may be disposed to overlap the light-blocking area BA. In some embodiments, the projection portion 330 may be disposed to overlap the thin film transistor Tr. Further, in some embodiments, the projection portion 330 may be disposed to be spaced from the color filter 230, and may not overlap the contact hole CH.

The projection portion 330 may include a first sub-color filter 331 and a second sub-color filter 333. The first sub-color filter 331 and the second sub-color filter 333 overlap each other over an overlap area OA. The disposition order of the first sub-color filter 331 and the second sub-color filter 333 may be variously changed. Illustratively, the first sub-color filter 331 may be disposed on the passivation layer 180, and at least a part of the second sub-color filter 333 may be disposed on the first sub-color filter 331.

Viewed from a plane, the first sub-color filter 331 may have a first width W11 along a first direction D1, and the second sub-color filter 333 may have a second width W13 along the first direction D1. Further, the first sub-color filter 331 may have a third width W21 along a second direction D2 intersecting the first direction D1, and the second sub-color filter 333 may have a fourth width W23 along the second direction D2.

The first width W11 of the first sub-color filter 331 may be different from the second width W13 of the second sub-color filter 333, and the third width W21 of the first sub-color filter 331 may be different from the fourth width W23 of the second sub-color filter 333. In an exemplary embodiment, the first width W11 of the first sub-color filter 331 may be 20 to 60 micrometers within a range different from the second width W13 of the second sub-color filter 333. Further, the second width W13 of the second sub-color filter 333 may be 5 to 35 micrometers within a range different from the first width W11 of the first sub-color filter 331. The third width W21 of the first sub-color filter 331 may be 30 to 50 micrometers within a range different from the fourth width W23 of the second sub-color filter 333. Further, the fourth width W23 of the second sub-color filter 333 may be 5 to 30 micrometers within a range different from the third width W21 of the first sub color filter 331.

The relative dimension between the first width W11 and the second width W13 and the relative dimension between the third width W21 and the fourth width w23 may be variously changed.

In some embodiments, the first width W11 of the first sub-color filter 331 may be smaller than the second width W13 of the second sub-color filter 333, and the third width W21 of the first sub-color filter 331 may be larger than the fourth width W23 of the second sub-color filter 333.

As described above, the first sub-color filter 331 and the second sub-color filter 333 may overlap each other to form the overlap area OA. In some embodiments, viewed from a plane, the first sub-color filter 331 and the second sub-color filter 333 may intersect each other.

In some embodiments, the maximum width WD1 of the overlap area OA in the first direction D1 may be substantially equal to the first width W11 of the first sub-color filter 331. Further, the maximum width WD2 of the overlap area OA in the second direction D2 may be substantially equal to the fourth width W23 of the second sub-color filter 333.

The overlap area OA formed by overlapping the first sub-color filter 331 and the second sub-color filter 333 is related to the reliability of a main spacer (MCS), which will be described later. For example, when the position and/or the size of the overlap area OA may be varied due to a process margin or the like, there is a possibility that the reliability of the display device 1 may be deteriorated because the height of the spacing member (MCS) or the elastic restoring force of the spacing member (MCS) may change. According to an embodiment of the present disclosure, even when the positions of the first sub-color filter 331 or the second sub-color filter 333 are partially changed due to a process margin, the maximum width WD1 of the overlap area OA in the first direction D1 and the maximum width WD2 of the overlap area OA in the second direction D2 may be kept substantially constant. Accordingly, the size of the overlap area OA between the first sub-color filter 331 and the second sub-color filter 333 may be kept uniform, thereby improving the reliability of the display device 1.

More specifically, the second width W13 of the second sub-color filter 333 may be larger than the first width W11 of the first sub-color filter 331. Therefore, even when the second sub-color filter 333 is formed as being shifted in the direction opposite to the first direction D1 according to a process margin as shown in FIG. 4A, or is formed as being shifted along the first direction D1 as shown in FIG. 4B, the maximum width WD1 of the overlap area OA in the first direction D1 may be substantially equal to the first width W11 of the first sub-color filter 331. Further, the size of the overlap area OA between the first sub-color filter 331 and the second sub-color filter 333 may be kept substantially constant, and thus the size of the overlap area OA may be maintained at a desired level.

Further, the third width W21 of the first sub-color filter 331 may be larger than the fourth width W23 of the second sub-color filter 333. Therefore, even when the first sub-color filter 331 is formed as being shifted in the direction opposite to the second direction D2 according to a process margin as shown in FIG. 5A, or is formed as being shifted along the second direction D2 as shown in FIG. 5B, the maximum width WD2 of the overlap area OA in the second direction D2 may be kept substantially equal to the fourth width W23 of the second sub-color filter 333. Further, the size of the overlap area OA may be substantially constant.

Meanwhile, although it is shown in FIGS. 2 to 5 that the planar shape of the first sub-color filter 331 and the second sub-color filter 333 is a quadrangle, this is only an example. Besides, the shape of the first sub-color filter 331 and the second sub-color filter 333 may have various shapes, such as a polygonal shape, a circular shape, an elliptical shape, a combinational shape of a polygon and a circle, and a combinational shape of a polygon and an ellipse.

Figure 6:
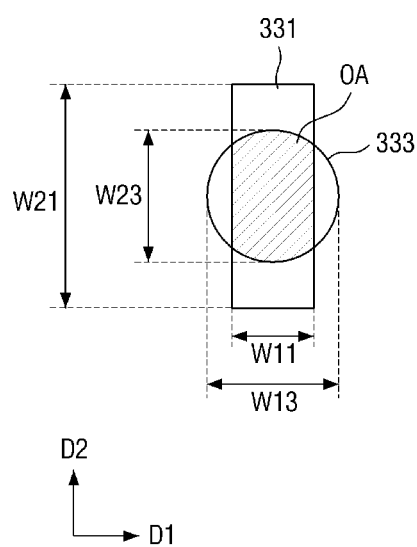
FIGS. 6 to 14 are plan views showing other modified examples of the projection portion shown in FIG. 3.

Illustratively, as shown in FIG. 6, the first sub-color filter 331 may have a polygonal shape such as a quadrangle, and the second sub-color filter 333 may have a circular shape in which the second width W13 and the fourth width W23 are substantially equal to each other.

Figure 7:
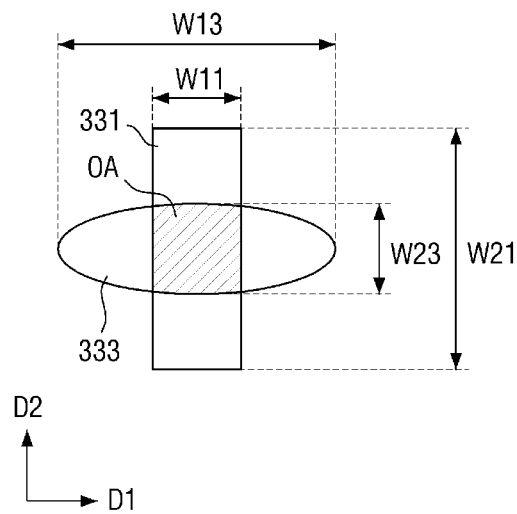

Further, as shown in FIG. 7, the first sub-color filter 331 may have a polygonal shape such as a quadrangle, and the second sub-color filter 333 may have an elliptical shape in which the second width W13 is larger than the fourth width W23.

Figure 8:
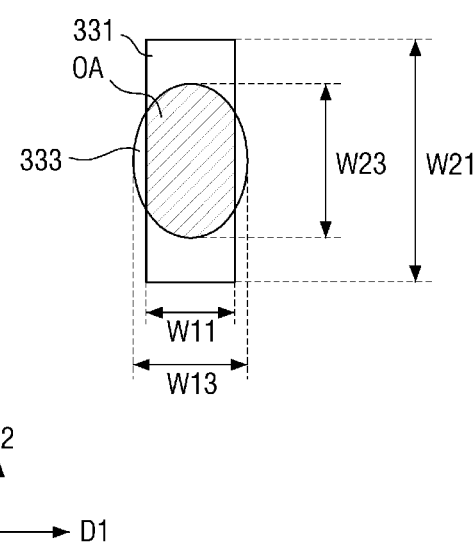

Further, as shown in FIG. 8, the first sub-color filter 331 may have a polygonal shape such as a quadrangle, and the second sub-color filter 333 may have an elliptical shape in which the second width W13 is smaller than the fourth width W23.

Figure 9:
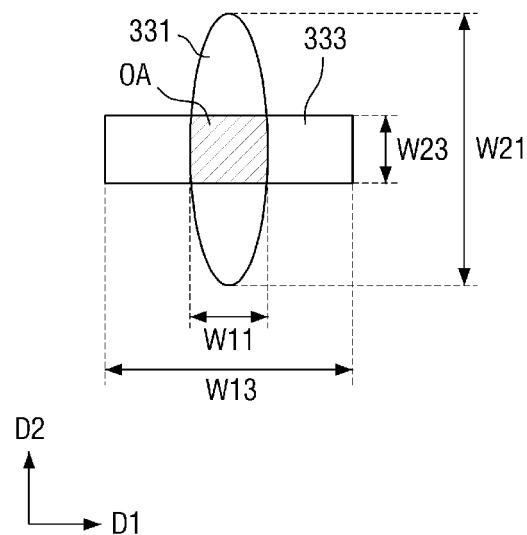

Further, as shown in FIG. 9, the first sub-color filter 331 may have an elliptical shape in which the first width W11 is smaller than the third width W21, and the second sub-color filter 333 may have a polygonal shape such as a quadrangle.

Figure 10:
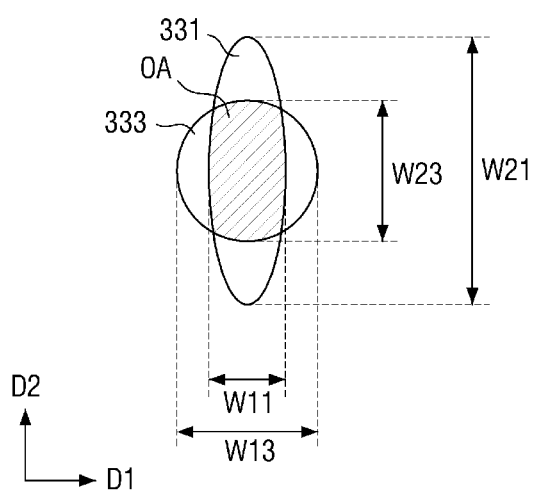

Further, as shown in FIG. 10, the first sub-color filter 331 may have an elliptical shape in which the first width W11 is smaller than the third width W21, and the second sub-color filter 333 may have a circular shape in which the second width W13 and the fourth width W23 are substantially equal to each other.

Figure 11:
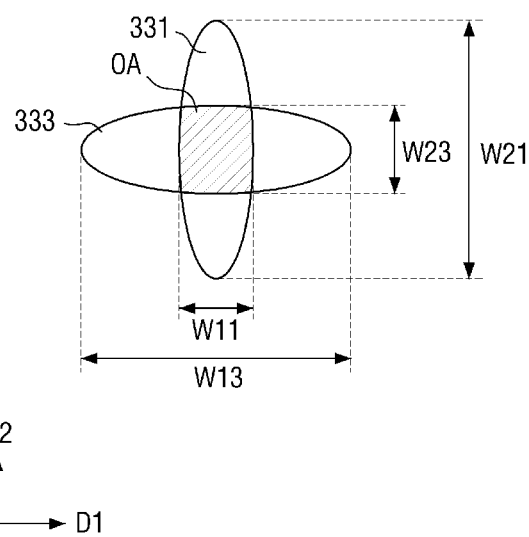

Further, as shown in FIG. 11, the first sub-color filter 331 may have an elliptical shape in which the first width W11 is smaller than the third width W21, and the second sub-color filter 333 may have an elliptical shape in which the second width W13 is larger than the fourth width W23.

Figure 12:
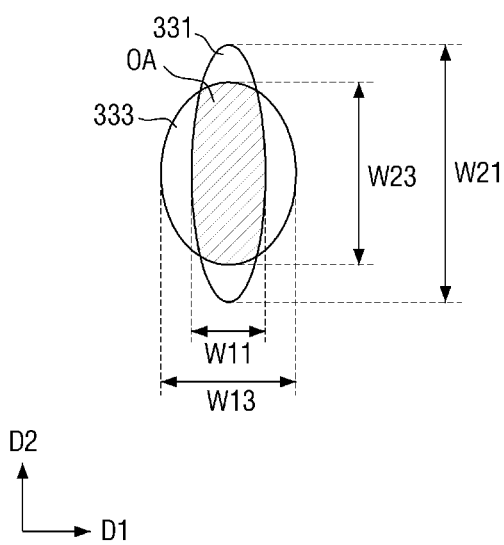

Further, as shown in FIG. 12, the first sub-color filter 331 may have an elliptical shape in which the first width W11 is smaller than the third width W21, and the second sub-color filter 333 may have an elliptical shape in which the second width W13 is smaller than the fourth width W23.

Figure 13:
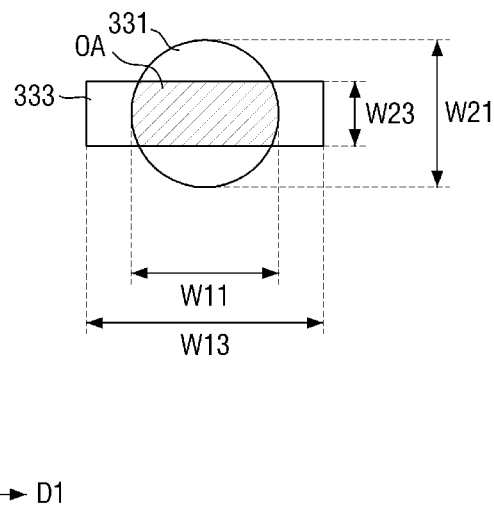

Further, as shown in FIG. 13, the first sub-color filter 331 may have a circular shape in which the first width W11 and the third width W21 are substantially equal to each other, and the second sub-color filter 333 may have a polygonal shape such as a quadrangle.

Figure 14:
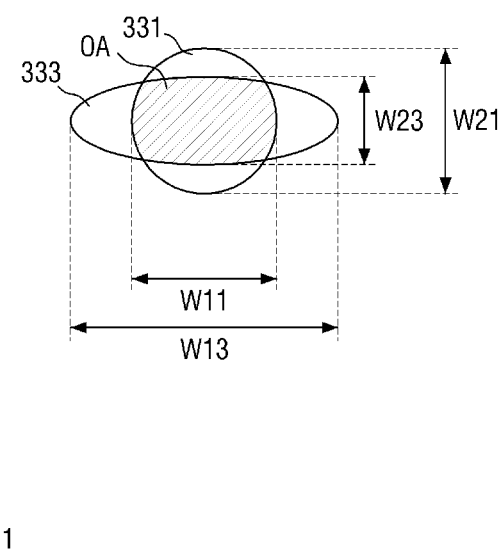

Further, as shown in FIG. 14, the first sub-color filter 331 may have a circular shape in which the first width W11 and the third width W21 are substantially equal to each other, and the second sub-color filter 333 may have an elliptical shape in which the second width W13 is larger than the fourth width W23.

The first sub-color filter 331 may be made of a photosensitive organic insulation material, and may further contain a first color pigment. In an exemplary embodiment, the first color pigment may be any one of a red pigment, a green pigment, and a blue pigment.

In some embodiments, the first sub-color filter 331 may be made of the same material as the color filter 230. For example, when the color filter 230 contains a red pigment as the color pigment, the first sub-color filter 331 may also contain a red pigment as the first color pigment. In this case, the color filter 230 and the first sub-color filter 331 may be simultaneously formed using the same mask. However, the present disclosure is not limited thereto, and the color filter 230 may also contain a color pigment that is different from the first color pigment contained in the first sub-color filter 331.

In some embodiments, the first sub-color filter 331 may be spaced from the color filter 230 without physically contacting each other. That is, viewed from a plane, the first sub-color filter 331 may not be connected to the color filter 230, and may have an island shape.

The second sub-color filter 333 may be made of a photosensitive organic insulation material, and may further contain a second color pigment. The second color pigment may be different from the first color pigment contained in the first sub-color filter 331. For example, when the first sub-color filter 331 contains a red pigment as the first color pigment, the second sub-color filter 333 may contain a green pigment or a blue pigment as the second color pigment. In some embodiments, the second sub-color filter 333 may contain a blue pigment. Among the color filters, a blue filter may be thicker than a red filter and a green filter. Thus, the second sub-color filter 333 may contain a blue pigment in order to form the thickness of the projection portion 330 to a desired level, and may be simultaneously formed together with the blue filter using the same mask. However, the present disclosure is not limited thereto, and the second color pigment contained in the second sub-color filter 230 may be variously selected as long as the second color pigment is different from the first color pigment contained in the first sub-color filter 331.

In some embodiments, the second sub-color filter 333 may be spaced from the color filter 230. That is, viewed from a plane, the second sub-color filter 333 may not be connected to the color filter 230, and may have an island shape.

When the display device 1 includes a red filter, a green filter, and a blue filter, examples of combinations of color pigments in the first sub-color filter 331, the second sub-color filter 333, and the color filter 230 are as follows. Each of the following parentheses means one color pigment combination. In each the parentheses, the first color pigment of the first sub-color filter 331, the second color pigment of the second sub-color filter 333, and the color pigment of the color filter 230 are sequentially described. Here, R is a red pigment, G is a green pigment, and B is a blue pigment.

(R, G, R), (R, G, G), (R, G, B), (R, B, R), (R, B, G), (R, B, B), (G, R, R), (G, R, G), (G, R, B), (G, B, R), (G, B, G), (G, B, B), (B, R, R), (B, R, G), (B, R, B), (B, G, R), (B, G, G), (B, G, B)

A light-blocking member 220 may be disposed on the projection portion 330 and the passivation layer 180. The light-blocking member 220 is a component for preventing light leakage, and is also referred to as a black matrix. The light-blocking member 220 may contain a light-blocking material, for example, a photosensitive organic material. The light-blocking member 220 may be disposed to overlap the light-blocking area BA, and may be disposed not to overlap the light-transmitting area TA. The light-blocking member 220 may be formed to extend along the first direction D1, and may cover parts of the projection portion 330, thin film transistor Tr, contact hole CH, and pixel electrode 190 overlapping the light-blocking area BA. In some embodiments, the light-blocking member 220 may further overlap the gate line 121 and the data line 171.

As described above, the color filter 230 may overlap the light-transmitting area TA, and may not substantially overlap the light-blocking area BA. Therefore, a portion of the passivation layer 180, the portion being disposed on the light-blocking area BA of the first base portion 110, may not be covered by the color filter 230, and may be in direct contact with the light-blocking member 220. In other words, the light-blocking member 220 may be partially in direct contact with the passivation layer 180.

A spacing member MCS may be disposed on the light-blocking member 220. The spacing member MCS serve to maintain a gap between the first display substrate 100 and the second display substrate 200 facing each other.

The spacing member MCS may overlap the projection portion 330. In particular, the spacing member MCS may overlap the overlap area OA between the first sub-color filter 331 and the second sub-color filter 333.

The spacing member MCS may contain a light-blocking material. In some embodiments, the spacing member MCS may be made of the same material as the light-blocking member 220, and may be formed to be integrated with the light-blocking member 220.

As described above, the projection portion 330 overlapping the light-blocking area BA may be disposed on the passivation layer 180. Further, since the light-blocking member 220 is formed on the projection portion 330, the light-blocking member 220 is provided with a step formed by the projection portion 330. A portion of the light-blocking member 220 that is provided with the step formed by the projection portion 330 may correspond to the spacing member MCS.

That is, according to an embodiment of the present disclosure, the light-blocking member 220 and the spacing member MCS may be formed at the same time by using the step formed by the projection portion 330 without using a multi-tone mask in the process of forming the light-blocking member 220. Therefore, there is an advantage that the manufacturing cost can be reduced because the multi-tone mask is not used.

Meanwhile, the projection portion 330 may overlap the thin film transistor Tr. Therefore, the spacing member MCS on the light-blocking member 220 may also overlap the thin film transistor Tr, and the height of the spacing member MCS may be further increased by the thickness of the thin film transistor Tr.

Hereinafter, the second display substrate 200 will be described.

The second display substrate 200 may include a second base portion 210 and a common electrode 270.

The second base portion 210, similarly to the first base portion 110, may be a transparent insulation plate. Further, the second base portion 210 may contain a polymer or a plastic having high heat resistance. In some embodiments, the second base portion 210 may have flexibility.

The common electrode 270 may be disposed on one side of the second base portion 210 facing the first display substrate 100. The common electrode 270 may be made of a transparent conductive material such as ITO or IZO. In some embodiments, the common electrode 270 may be formed over the entire surface of the second base portion 210. A common voltage Vcom may be applied to the common electrode 270 to form an electric field together with the pixel electrode 190.

Hereinafter, the liquid crystal layer 300 will be described.

The liquid crystal layer 300 may include a plurality of liquid crystal molecules having dielectric anisotropy. When an electric field is applied between the first display substrate 100 and the second display substrate 200, the liquid crystal molecules align in a specific direction between the first display substrate 100 and the second display substrate 200, thereby transmitting or blocking light. Here, the term 'alignment' may mean not only that the liquid crystal molecules actually align, but also that the arrangement of the liquid crystal molecules is changed by the electric field. In some embodiments, the liquid crystal layer 300 may contain a reactive mesogen that undergoes a polymerization reaction with light such as ultraviolet rays, or may contain a linear gradient-providing polymer formed by the polymerization reaction of the reactive mesogen. The linear gradient-providing polymer may provide a linear gradient to the liquid crystal molecules even when no electric field is formed between the first display substrate 100 and the second display substrate 200.

Since the aforementioned display device 1 includes both the color filter 230 and the light-blocking member 220 on the first display substrate 100 on which the thin film transistor Tr and the pixel electrode 190 are disposed, the misalignment between the pixel electrode 190 and the color filter 230 or the misalignment between the light-transmitting area TA and the light-blocking area BA can be reduced or prevented, and the misalignment between the light-blocking member 220 and the light-blocking area BA can be prevented.

Since the light-blocking member 220 and the spacing member MCS may be simultaneously formed over the projection portion 330, there is an advantage of reducing a manufacturing cost. Further, since the light-blocking member 220 and the spacing member MCS may be simultaneously formed without using a multi-tone mask such as a half-tone mask, there is an advantage of further reducing a manufacturing cost. Moreover, since the projection portion 330 may be simultaneously formed in a process of manufacturing the color filter 230, there is an advantage of simplifying the manufacturing process. Furthermore, since the overlap area OA between the first sub-color filter 331 and the second sub-color filter 333 may be uniformly maintained regardless of a process margin, there is an advantage of improving the reliability of the display device 1.

Figure 17:
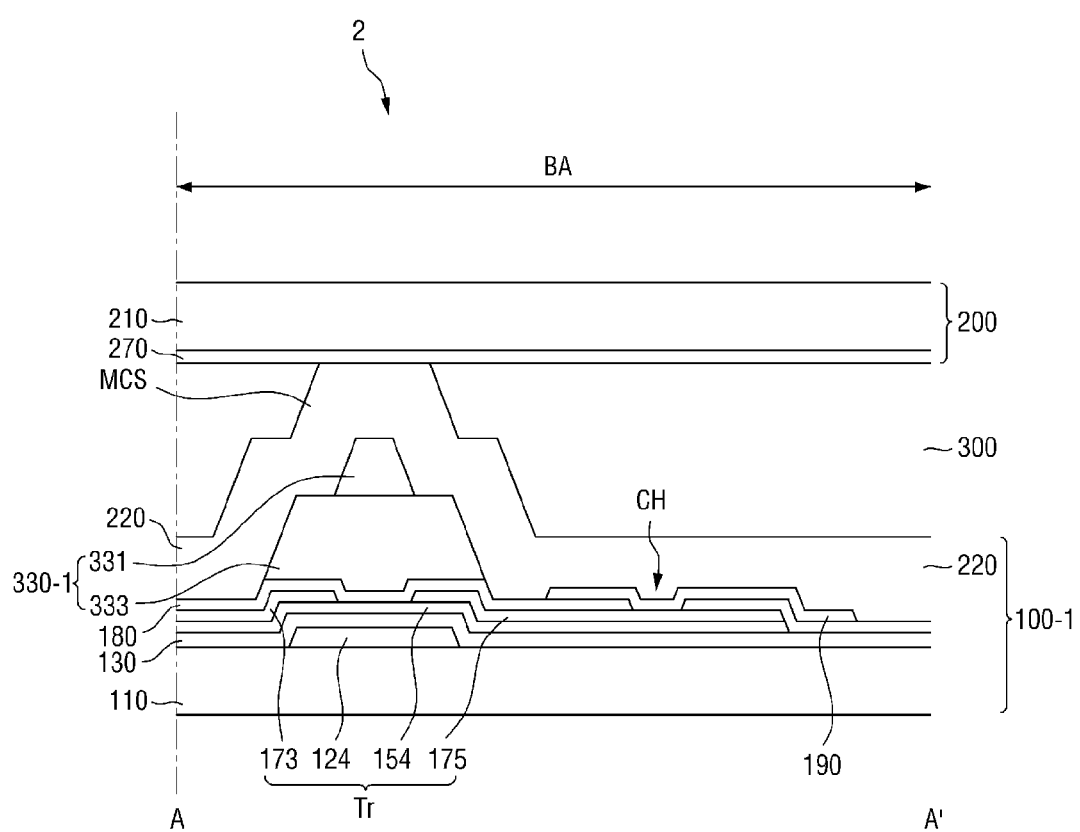
FIG. 17 is a sectional view of a display device according to another embodiment of the present disclosure, taken along the line A-A' of FIG. 1.
Figure 18:
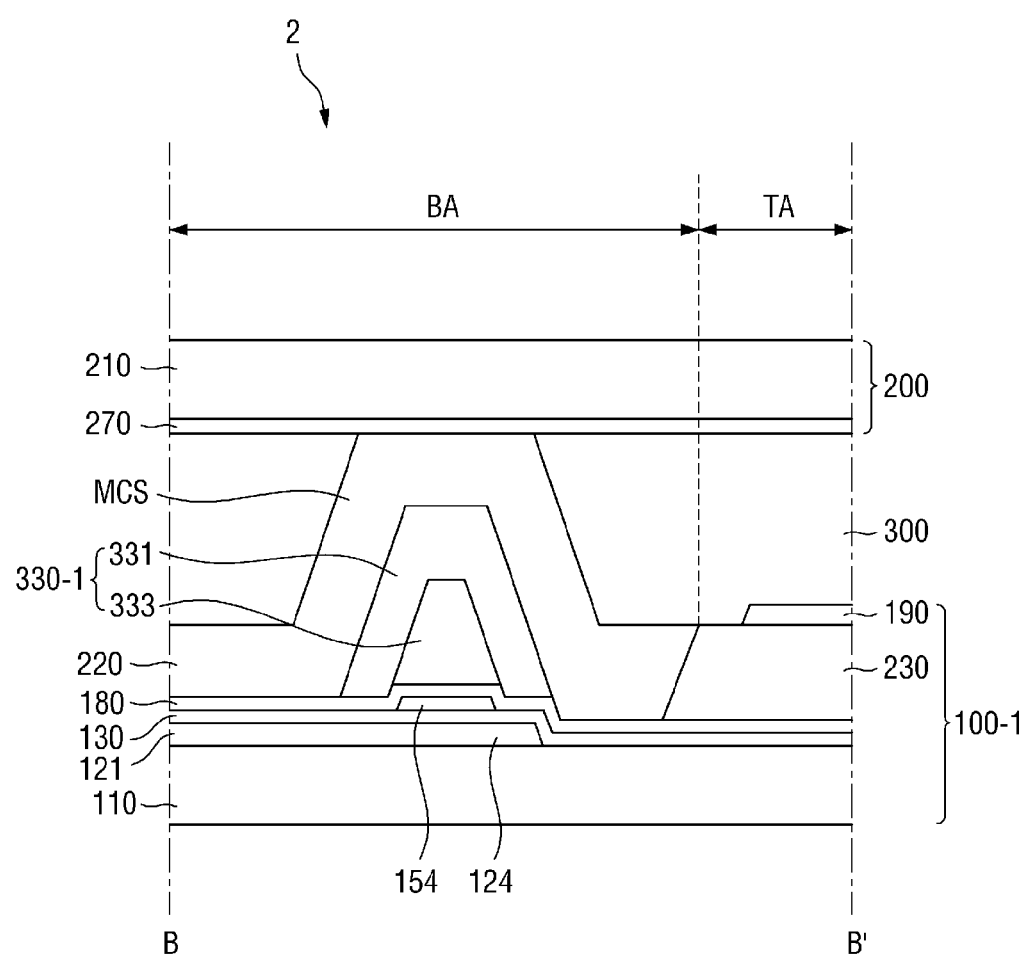
FIG. 18 is a sectional view of a display device according to another embodiment of the present disclosure, taken along the line B-B' of FIG. 1.

FIG. 17 is a sectional view of a display device according to another embodiment of the present disclosure, taken along the line A-A' of FIG. 1, and FIG. 18 is a sectional view of a display device according to another embodiment of the present disclosure, taken along the line B-B' of FIG. 1.

Referring to FIGS. 17 and 18, the display device 2 according to this embodiment may include a first display substrate 100-1, a second display substrate 200 facing the first display substrate 100-1, and a liquid crystal layer 300 disposed between the first display substrate 100-1 and the second display substrate 200.

The display device 2 is different from the aforementioned display device 1 of FIGS. 1, 2, 15, and 16 in only the configuration of a projection portion 330-1, and the display device 2 is substantially the same as or similar to the aforementioned display device 1 in other configurations. Therefore, the repeated description of the constituent elements may be omitted, and differences will be mainly described below.

The projection portion 330-1 may include a first sub-color filter 331 and a second sub-color filter 333, and the first sub-color filter 331 and the second sub-color filter 333 may overlap each other over an overlap area OA. The second sub-color filter 333 may be disposed on the passivation layer 180, and at least a part of the first sub-color filter 331 may be disposed on the second sub-color filter 333. That is, in this embodiment, the projection portion 330-1 is different from the aforementioned projection portion 330 of FIGS. 15 and 16 in only the disposition order of the first sub-color filter 331 and the second sub-color filter 333, and is substantially the same as the aforementioned projection portion 330 in other configurations.

In addition, the description of the first sub-color filter 331 and the second sub-color filter 333 will be omitted because it is substantially the same as that described with reference to FIGS. 1 to 16.

Figure 19:
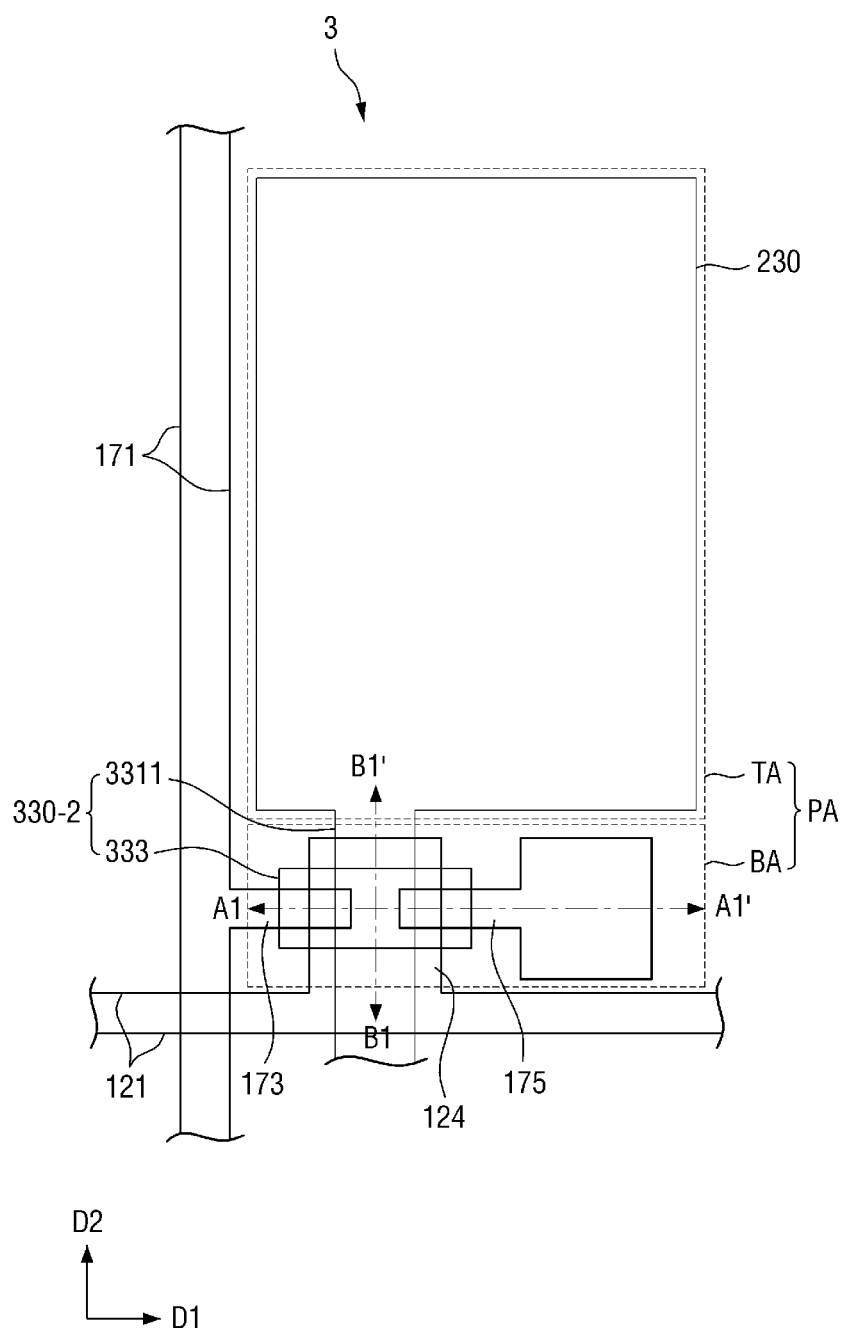
FIG. 19 is a plan view schematically showing the arrangement relationship among a color filter, a projection portion, a gate line, and a data line in the display device according to still another embodiment of the present disclosure.
Figure 20:
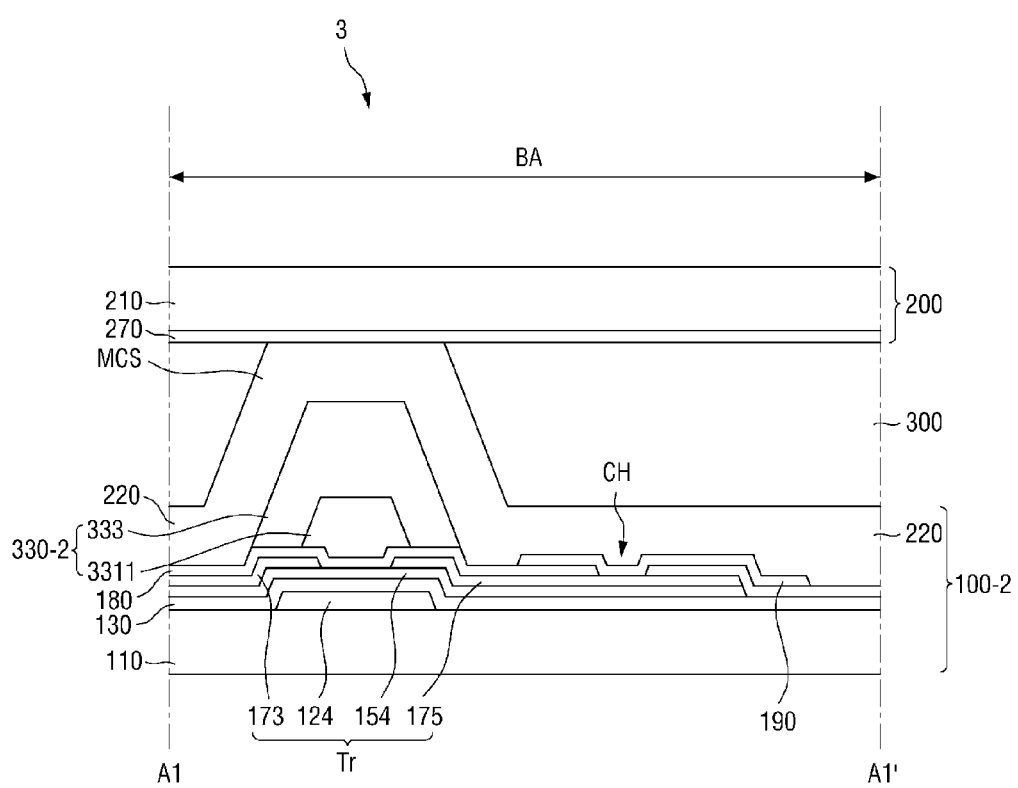
FIG. 20 is a sectional view of a display device according to still another embodiment of the present disclosure, taken along the line A1-A1' of FIG. 19.

FIG. 19 is a plan view schematically showing the arrangement relationship among a color filter, a projection portion, a gate line, and a data line in the display device according to still another embodiment of the present disclosure; FIG. 20 is a sectional view of a display device according to still another embodiment of the present disclosure, taken along the line A1-A1' of FIG. 19; and FIG. 21 is a sectional view of a display device according to still another embodiment of the present disclosure, taken along the line B1-B1' of FIG. 19.

Figure 21:
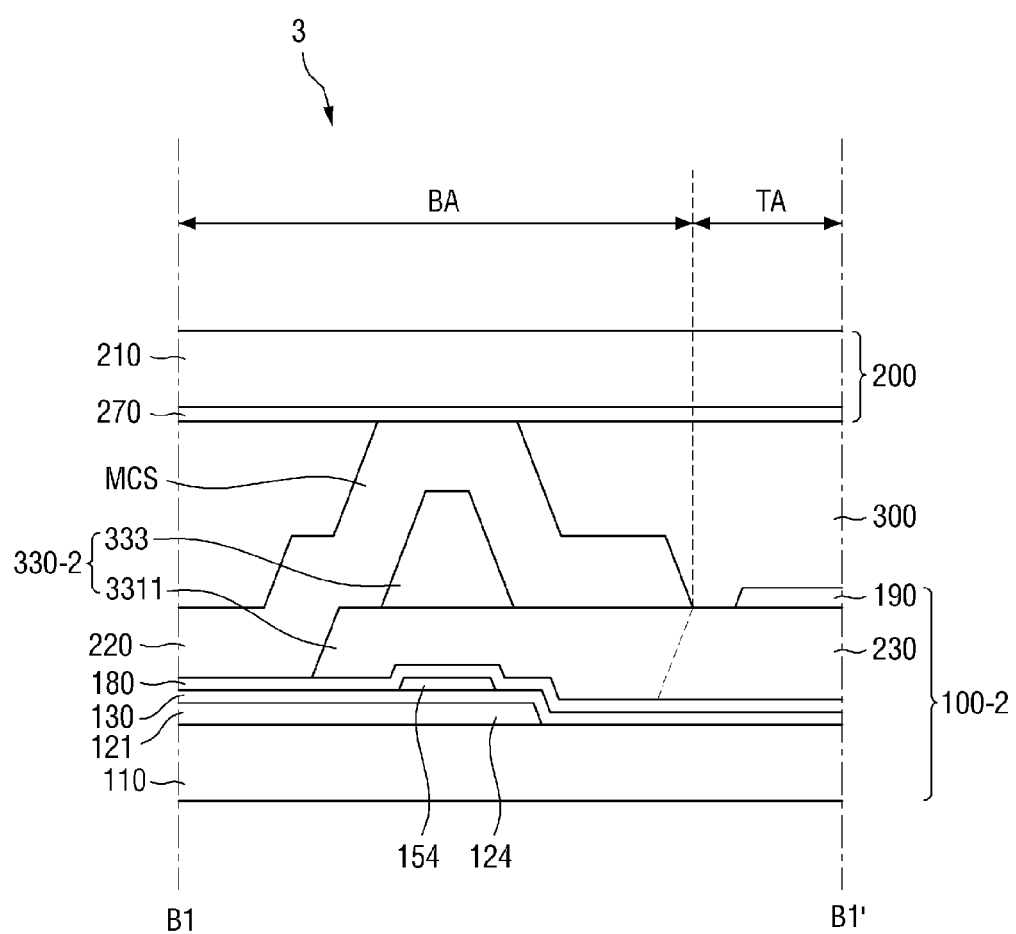
FIG. 21 is a sectional view of a display device according to still another embodiment of the present disclosure, taken along the line B1-B1' of FIG. 19.

Referring to FIGS. 19 to 21, the display device 3 according to this embodiment may include a first display substrate 100-2, a second display substrate 200 facing the first display substrate 100-2, and a liquid crystal layer 300 disposed between the first display substrate 100-2 and the second display substrate 200.

The display device 3 is different from the aforementioned display device 1 of FIGS. 1, 2, 15, and 16 in that the shape of a projection portion 330-2 is different from the shape of the projection portion 330 of FIGS. 2, 15, and 16, and is substantially the same as or similar to the aforementioned display device 1 in other configurations. Therefore, the repeated description of the constituent elements may be omitted, and differences will be mainly described below.

The projection portion 330-2 may include a first sub-color filter 3311 and a second sub-color filter 333, and the first sub-color filter 3311 may be connected with the color filter 230 along the second direction D2 without being spaced from the color filter 230. In some embodiments, the first sub-color filter 3311 may be connected with the color filters 230 adjacent to each other along the second direction D2.

The disposition order of the first sub-color filter 3311 and the second sub-color filter 333 may be variously changed. Illustratively, the first sub-color filter 3311 may be disposed on the passivation layer 180, and at least a part of the second sub-color filter 333 may be disposed on the first sub-color filter 3311.

In some embodiments, the first sub-color filter 3311 and the color filter 230 may contain the same color pigment, and may be made of the same material. That is, the first sub-color filter 3311 and the color filter 230 may be integrally formed, or may be simultaneously formed using the same mask.

In a case where the display device 3 includes a red filter, a green filter, and a blue filter, examples of combinations of color pigments in the first sub-color filter 3311, the second sub-color filter 333, and the color filter 230 are as follows. Each of the following parentheses means one color pigment combination. In each the parentheses, the first color pigment of the first sub-color filter 3311, the second color pigment of the second sub-color filter 333, and the color pigment of the color filter 230 are sequentially described. Here, R is a red pigment, G is a green pigment, and B is a blue pigment.

(R, G, R), (R, B, R), (G, R, G), (G, B, G), (B, R, B), (B, G, B)

Figure 22:
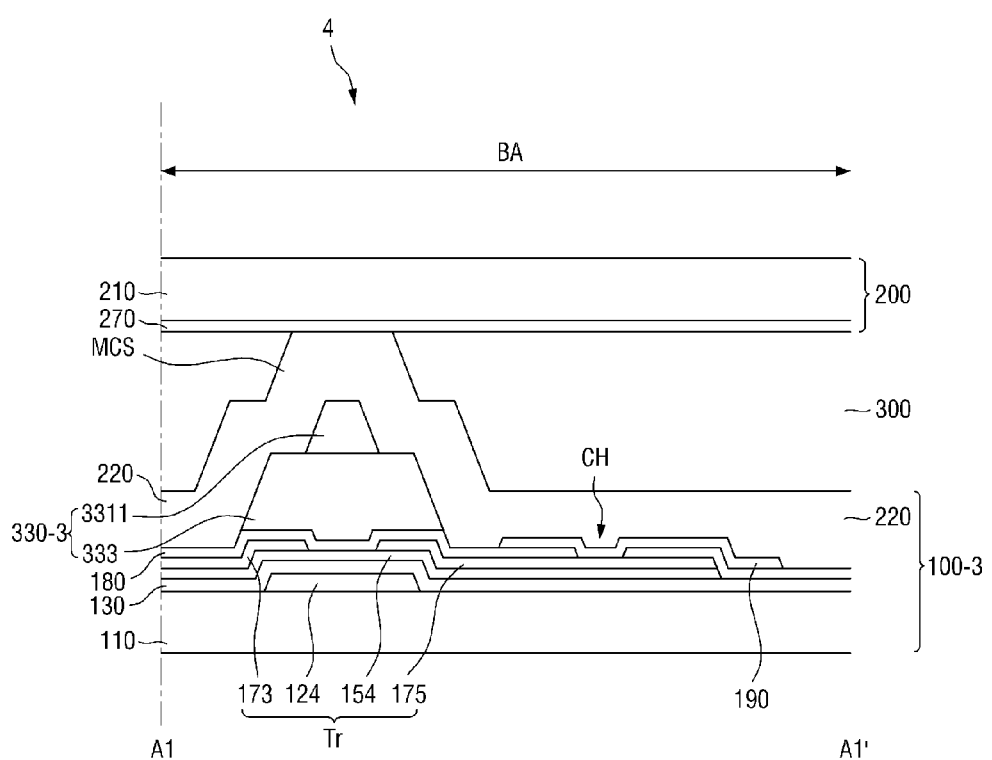
FIG. 22 is a sectional view of a display device according to still another embodiment of the present disclosure, taken along the line A1-A1' of FIG. 19.
Figure 23:
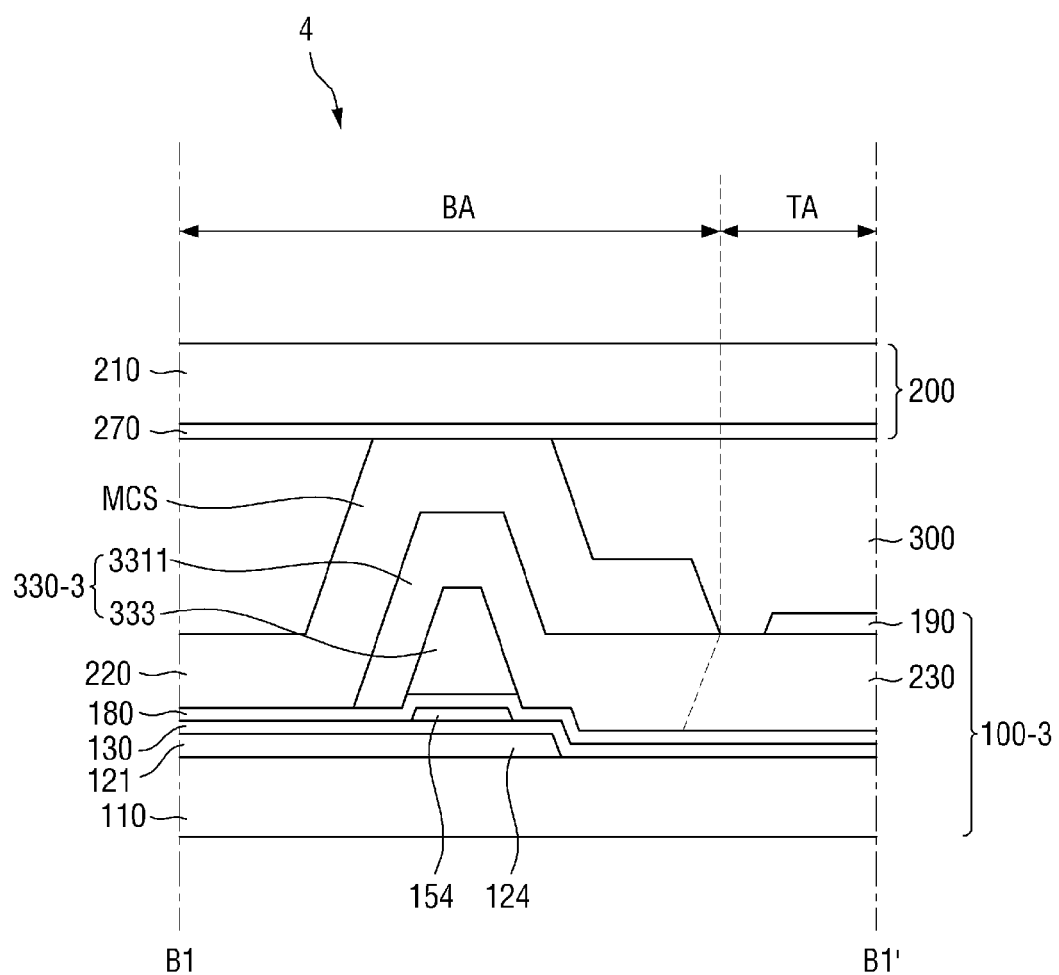
FIG. 23 is a sectional view of a display device according to still another embodiment of the present disclosure, taken along the line B1-B1' of FIG. 19.

FIG. 22 is a sectional view of a display device according to still another embodiment of the present disclosure, taken along the line A1-A1' of FIG. 19; and FIG. 23 is a sectional view of a display device according to still another embodiment of the present disclosure, taken along the line B1-B1' of FIG. 19.

Referring to FIGS. 22 and 23, the display device 4 according to this embodiment may include a first display substrate 100-3, a second display substrate 200 facing the first display substrate 100-3, and a liquid crystal layer 300 disposed between the first display substrate 100-3 and the second display substrate 200.

The display device 4 is different from the aforementioned display device 1 of FIGS. 1, 2, 15, and 16 in only the configuration of a projection portion 330-3, and is substantially the same as or similar to the aforementioned display device 1 in other configurations. Therefore, the repeated description of the constituent elements may be omitted, and differences will be mainly described below.

The projection portion 330-3 may include a first sub-color filter 3311 and a second sub-color filter 333. The second sub-color filter 333 may be disposed on the passivation layer 180, and at least a part of the first sub-color filter 3311 may be disposed on the second sub-color filter 333. That is, in this embodiment, the projection portion 330-3 is different from the aforementioned projection portion 330-2 of FIGS. 19 to 21 in only the disposition order of the first sub-color filter 3311 and the second sub-color filter 333, and is substantially the same as the aforementioned projection portion 330-2 in other configurations.

Figure 24:
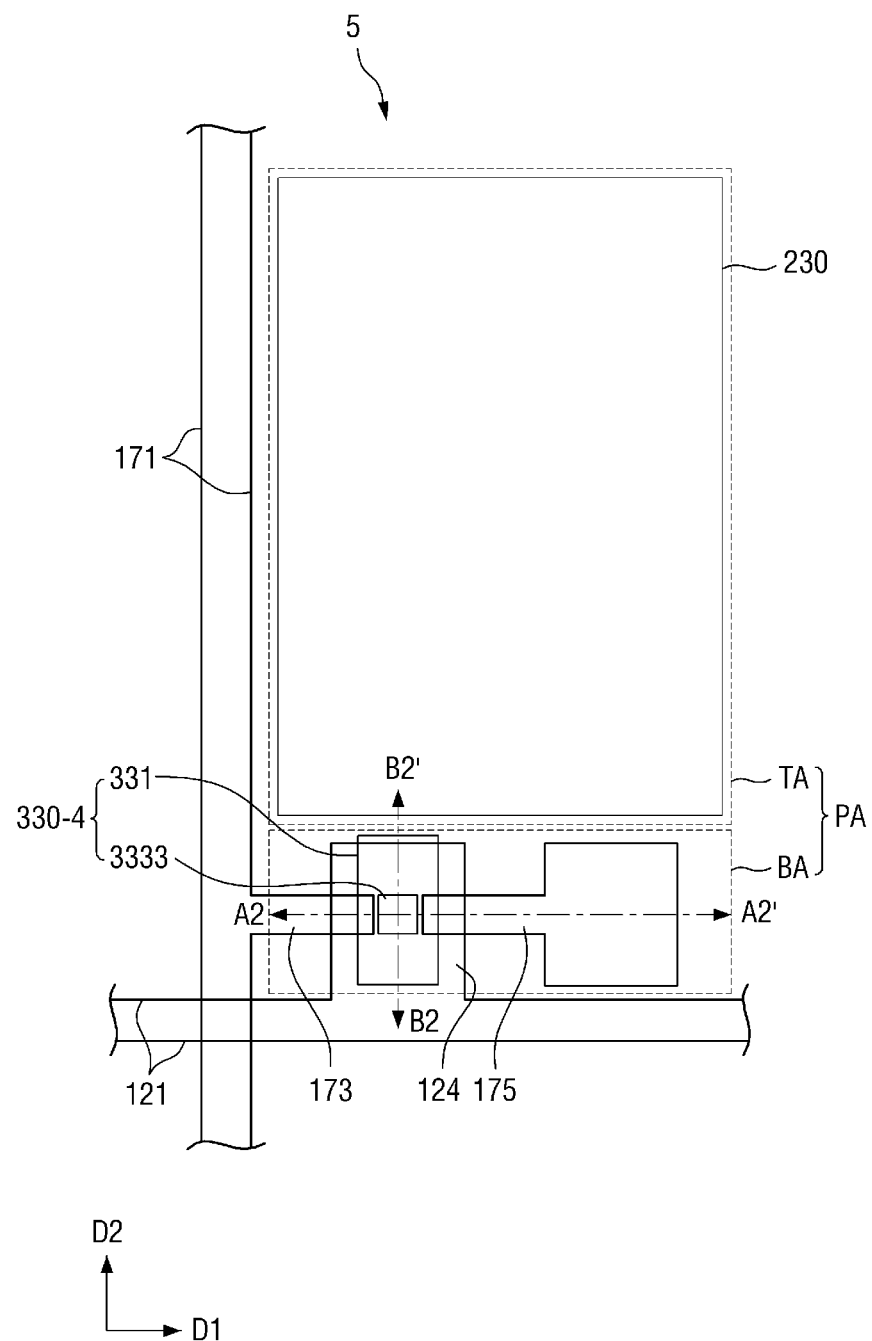
FIG. 24 is a plan view schematically showing the arrangement relationship among a color filter, a projection portion, a gate line, and a data line in the display device according to still another embodiment of the present disclosure.
Figure 41:
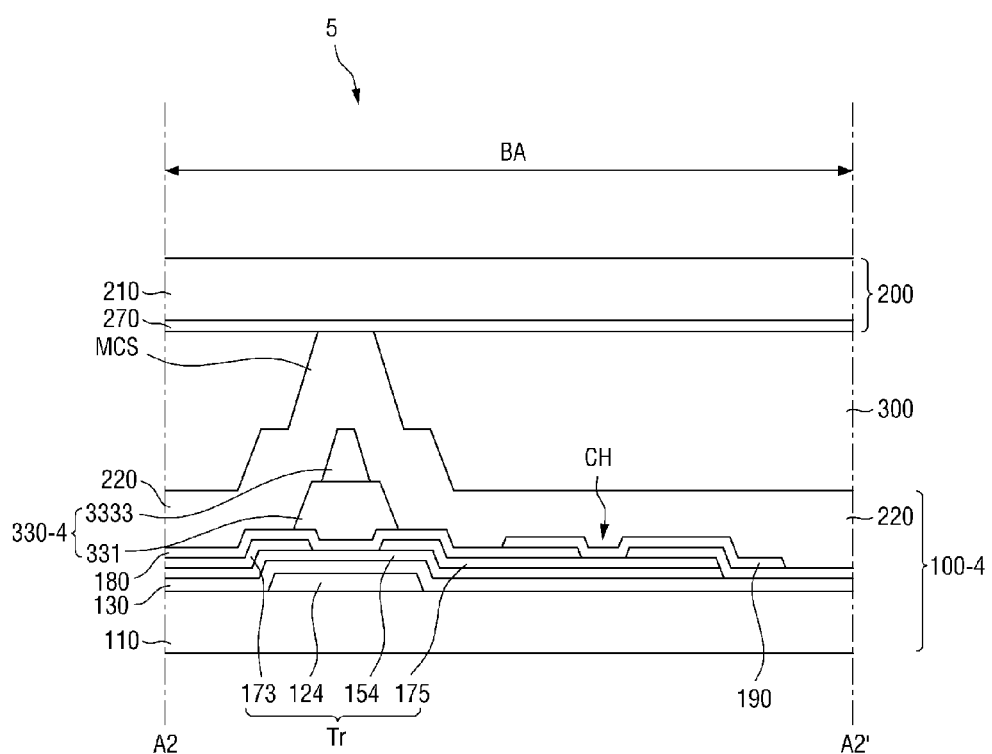
FIG. 41 is a sectional view of a display device according to still another embodiment of the present disclosure, taken along the line A2-A2' of FIG. 24.
Figure 42:
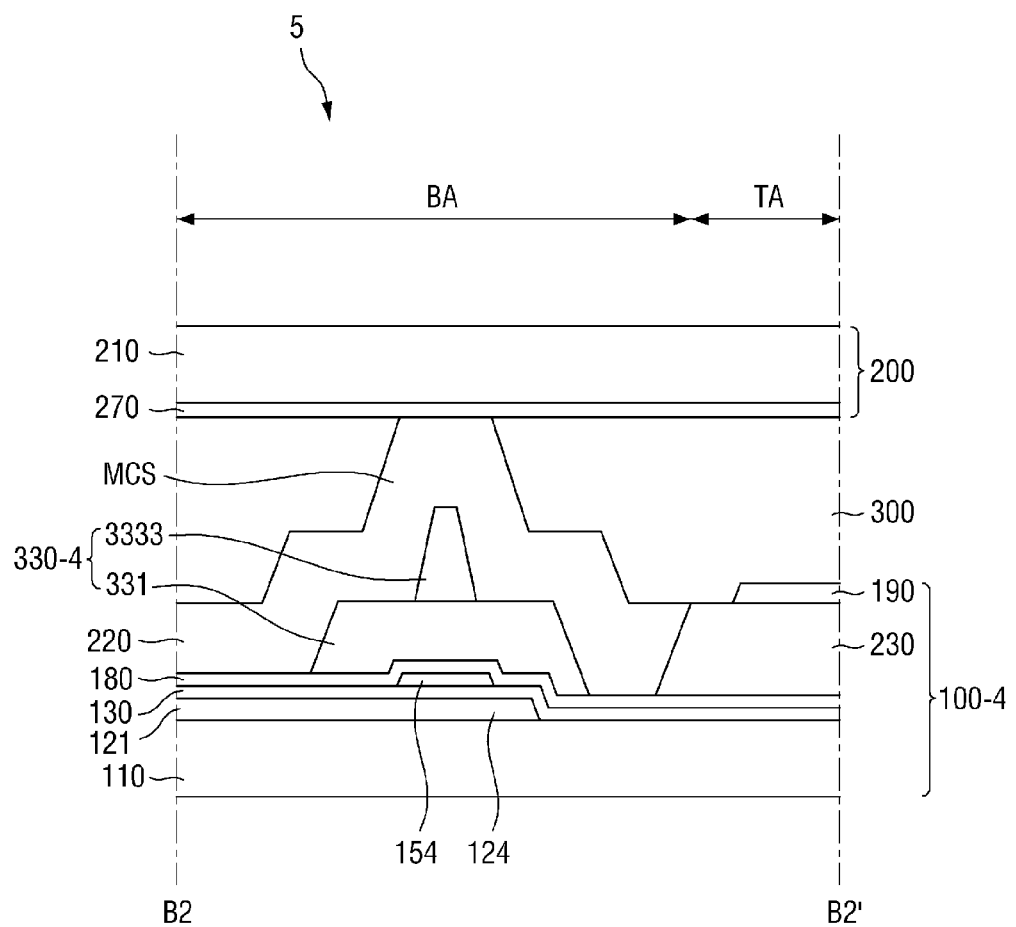
FIG. 42 is a sectional view of a display device according to still another embodiment of the present disclosure, taken along the line B2-B2' of FIG. 24.

FIG. 24 is a plan view schematically showing the arrangement relationship among a color filter, a projection portion, a gate line, and a data line in the display device according to still another embodiment of the present disclosure; FIG. 25 is a plan view of the projection portion shown in FIG. 24; FIGS. 26 to 40 are plan views showing modified examples of the projection portion shown in FIG. 25; FIG. 41 is a sectional view of a display device according to still another embodiment of the present disclosure, taken along the line A2-A2' of FIG. 24; and FIG. 42 is a sectional view of a display device according to still another embodiment of the present disclosure, taken along the line B2-B2' of FIG. 24.

Referring to FIGS. 24 to 42, the display device 5 according to this embodiment may include a first display substrate 100-4, a second display substrate 200 facing the first display substrate 100-4, and a liquid crystal layer 300 disposed between the first display substrate 100-4 and the second display substrate 200.

The display device 5 is different from the aforementioned display device 1 of FIGS. 1, 2, 15, and 16 in only the configuration of a projection portion 330-4, and is substantially the same as or similar to the aforementioned display device 1 in other configurations. Therefore, the repeated description of the constituent elements may be omitted, and differences will be mainly described below.

The projection portion 330-4 may include a first sub-color filter 331 and a second sub-color filter 3333, and the first sub-color filter 331 and the second sub-color filter 3333 may overlap each other over an overlap area OAa. The first sub-color filter 331 may be disposed on the passivation layer 180, and at least a part of the second sub-color filter 3333 may be disposed on the first sub-color filter 331. In some embodiments, the entire second sub-color filter 3333 may be disposed on the first sub-color filter 331.

Viewed from a plane, the first sub-color filter 331 may have a first width W11 along a first direction D1, and the second sub-color filter 3333 may have a second width W14 along the first direction D1. Further, the first sub-color filter 331 may have a third width W21 along a second direction D2, and the second sub-color filter 3333 may have a fourth width W24 along the second direction D2.

The first width W11 may be different from the second width W14, and the third width W21 may be different from the fourth width W24.

In some embodiments, the first width W11 of the first sub-color filter 331 may be larger than the second width W14 of the second sub-color filter 3333, and the third width W21 of the first sub-color filter 331 may be larger than the fourth width W24 of the second sub-color filter 3333.

In some embodiments, viewed from a plane, the second sub-color filter 3333 may completely overlap the first sub-color filter 331.

In some embodiments, the maximum width WD1a of the overlap area OAa in the first direction D1 may be substantially equal to the second width W14 of the second sub-color filter 3333. Further, the maximum width WD2a of the overlap area OAa in the second direction D2 may be substantially equal to the fourth width W24 of the second sub-color filter 3333. Further, view from plane, the overlap area OAa may be substantially equal to the area of the second sub-color filter 3333.

As describe above, the first width W11 may be larger than the second width W14, and the third width W21 may be larger than the fourth width W24. Therefore, even when the first sub-color filter 331 is shifted in any one direction of the first direction D1, the opposite direction of the first direction D1, the second direction D2, and the opposite direction of the second direction D2, the overlap area OAa may be maintained to be substantially equal to the area of the second sub-color filter 3333. Similarly, even when the second sub-color filter 3333 is shifted in any one direction of the first direction D1, the opposite direction of the first direction D1, the second direction D2, and the opposite direction of the second direction D2, the overlap area OAa may be maintained to be substantially equal to the area of the second sub-color filter 3333.

Meanwhile, although it is shown in FIGS. 24 and 25 that the planar shape of the first sub-color filter 331 and the second sub-color filter 3333 is a quadrangle, this is only one example. Besides, the shape of the first sub-color filter 331 and the second sub-color filter 3333 may have various shapes, such as a polygonal shape, a circular shape, an elliptical shape, a combinational shape of a polygon and a circle, and a combinational shape of a polygon and an ellipse.

Illustratively, as shown in FIG. 26, the first sub-color filter 331 may have a polygonal shape such as a quadrangle, and the second sub-color filter 3333 may have a circular shape in which the second width W14 and the fourth width W24 are substantially equal to each other.

Figure 27:
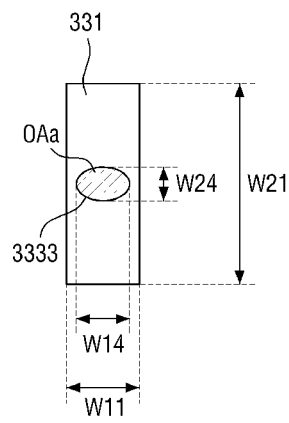

Further, as shown in FIG. 27, the first sub-color filter 331 may have a polygonal shape such as a quadrangle, and the second sub-color filter 3333 may have an elliptical shape in which the second width W14 is larger than the fourth width W24.

Figure 28:
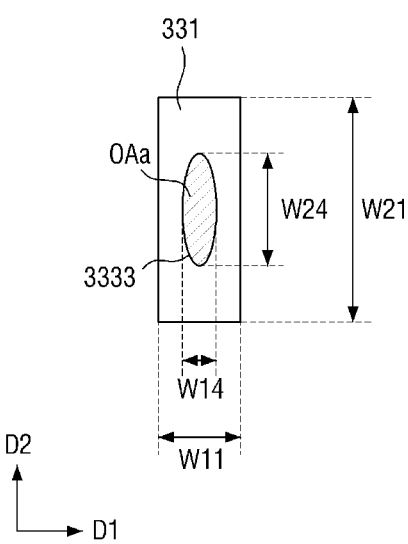

Further, as shown in FIG. 28, the first sub-color filter 331 may have a polygonal shape such as a quadrangle, and the second sub-color filter 3333 may have an elliptical shape in which the second width W14 is smaller than the fourth width W24.

Figure 29:
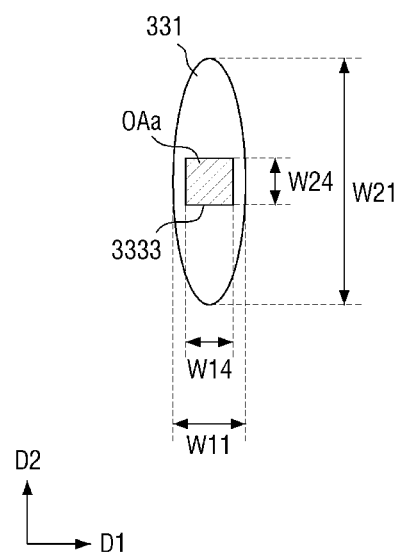

Further, as shown in FIG. 29, the first sub-color filter 331 may have an elliptical shape in which the first width W11 is smaller than the third width W21, and the second sub-color filter 3333 may have a polygonal shape such as a quadrangle.

Figure 30:
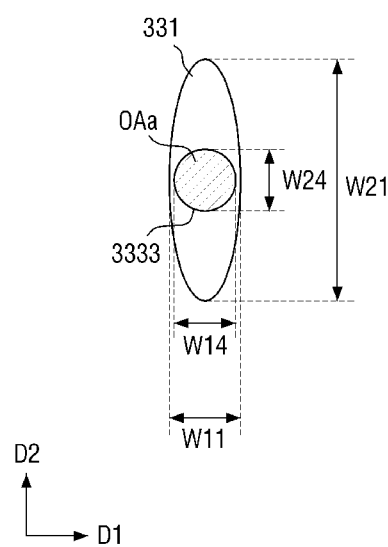

Further, as shown in FIG. 30, the first sub-color filter 331 may have an elliptical shape in which the first width W11 is smaller than the third width W21, and the second sub-color filter 3333 may have a circular shape in which the second width W14 and the fourth width W24 are substantially equal to each other.

Figure 31:
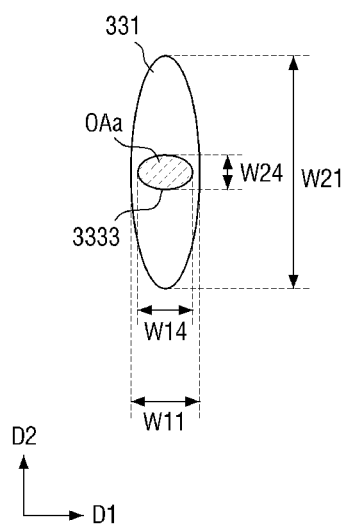

Further, as shown in FIG. 31, the first sub-color filter 331 may have an elliptical shape in which the first width W11 is smaller than the third width W21, and the second sub-color filter 3333 may have an elliptical shape in which the second width W14 is larger than the fourth width W24.

Figure 32:
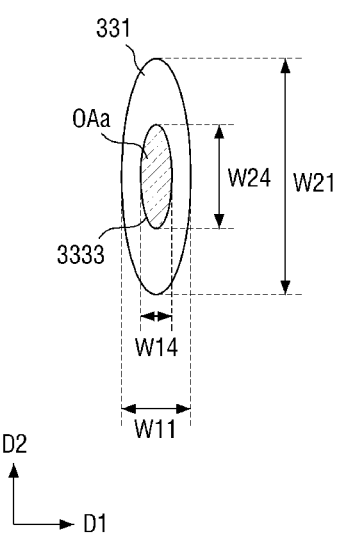

Further, as shown in FIG. 32, the first sub-color filter 331 may have an elliptical shape in which the first width W11 is smaller than the third width W21, and the second sub-color filter 3333 may have an elliptical shape in which the second width W14 is smaller than the fourth width W24.

Figure 33:
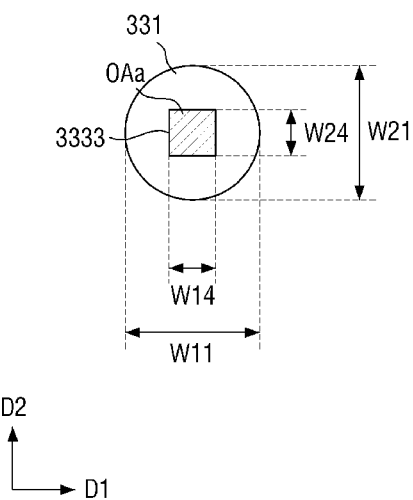

Further, as shown in FIG. 33, the first sub-color filter 331 may have a circular shape in which the first width W11 and the third width W21 are substantially equal to each other, and the second sub-color filter 3333 may have a polygonal shape such as a quadrangle.

Figure 34:
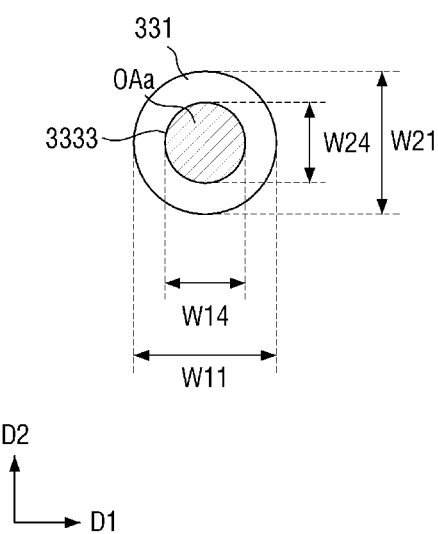

Further, as shown in FIG. 34, the first sub-color filter 331 may have a circular shape in which the first width W11 and the third width W21 are substantially equal to each other, and the second sub-color filter 3333 may have a circular shape in which the second width W14 and the fourth width W24 are substantially equal to each other.

Figure 35:
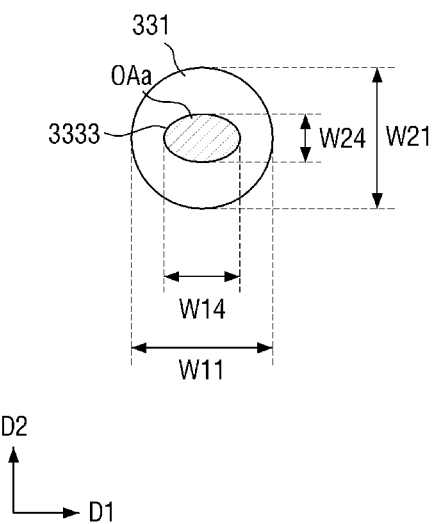

Further, as shown in FIG. 35, the first sub-color filter 331 may have a circular shape in which the first width W11 and the third width W21 are substantially equal to each other, and the second sub-color filter 3333 may have an elliptical shape in which the second width W14 is larger than the fourth width W24.

Figure 36:
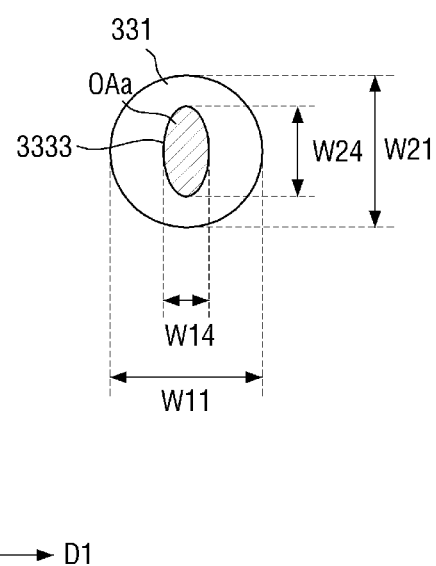

Further, as shown in FIG. 36, the first sub-color filter 331 may have a circular shape in which the first width W11 and the third width W21 are substantially equal to each other, and the second sub-color filter 3333 may have an elliptical shape in which the second width W14 is smaller than the fourth width W24.

Figure 37:
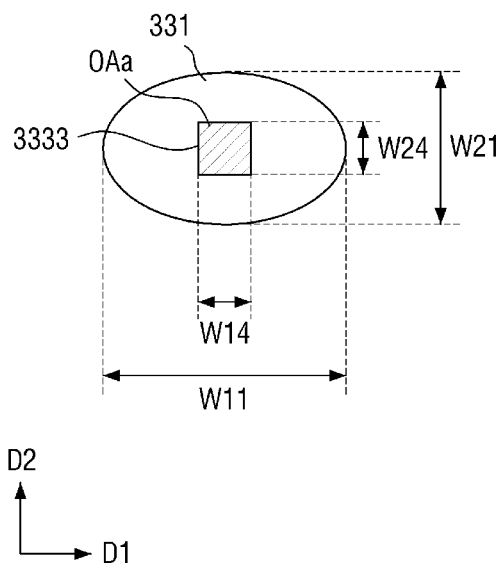

Further, as shown in FIG. 37, the first sub-color filter 331 may have an elliptical shape in which the first width W11 is larger than the third width W21, and the second sub-color filter 3333 may have a polygonal shape such as a quadrangle.

Figure 38:
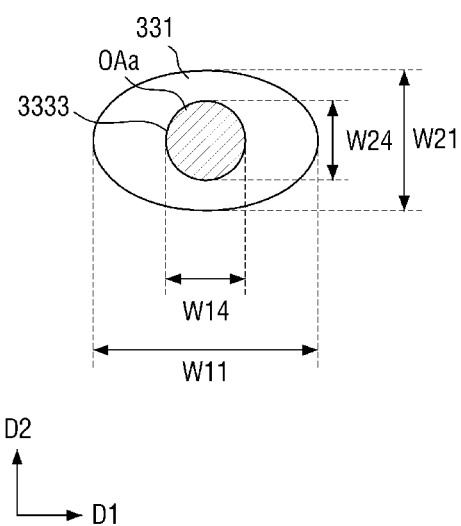

Further, as shown in FIG. 38, the first sub-color filter 331 may have an elliptical shape in which the first width W11 is larger than the third width W21, and the second sub-color filter 3333 may have a circular shape in which the second width W14 and the fourth width W24 are substantially equal to each other.

Figure 39:
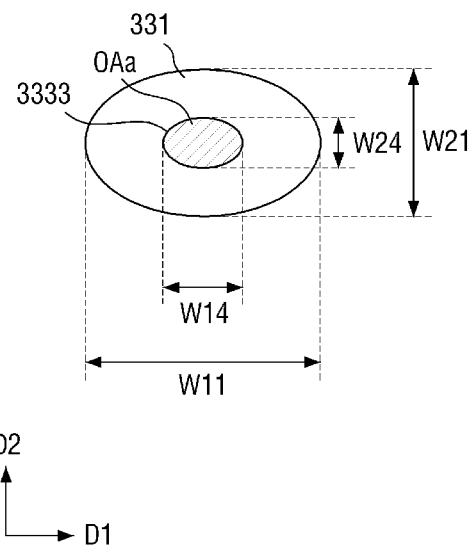

Further, as shown in FIG. 39, the first sub-color filter 331 may have an elliptical shape in which the first width W11 is larger than the third width W21, and the second sub-color filter 3333 may have an elliptical shape in which the second width W14 is larger than the fourth width W24.

Figure 40:
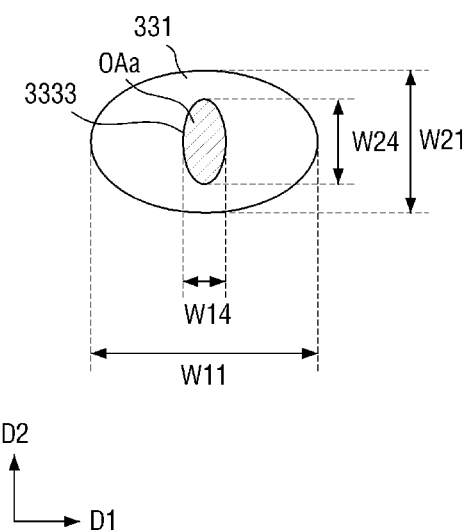

Further, as shown in FIG. 40, the first sub-color filter 331 may have an elliptical shape in which the first width W11 is larger than the third width W21, and the second sub-color filter 3333 may have an elliptical shape in which the second width W14 is smaller than the fourth width W24.

Besides, the shape of the first sub-color filter 331 and the second sub-color filter 3333 may be variously changed.

Figure 43:
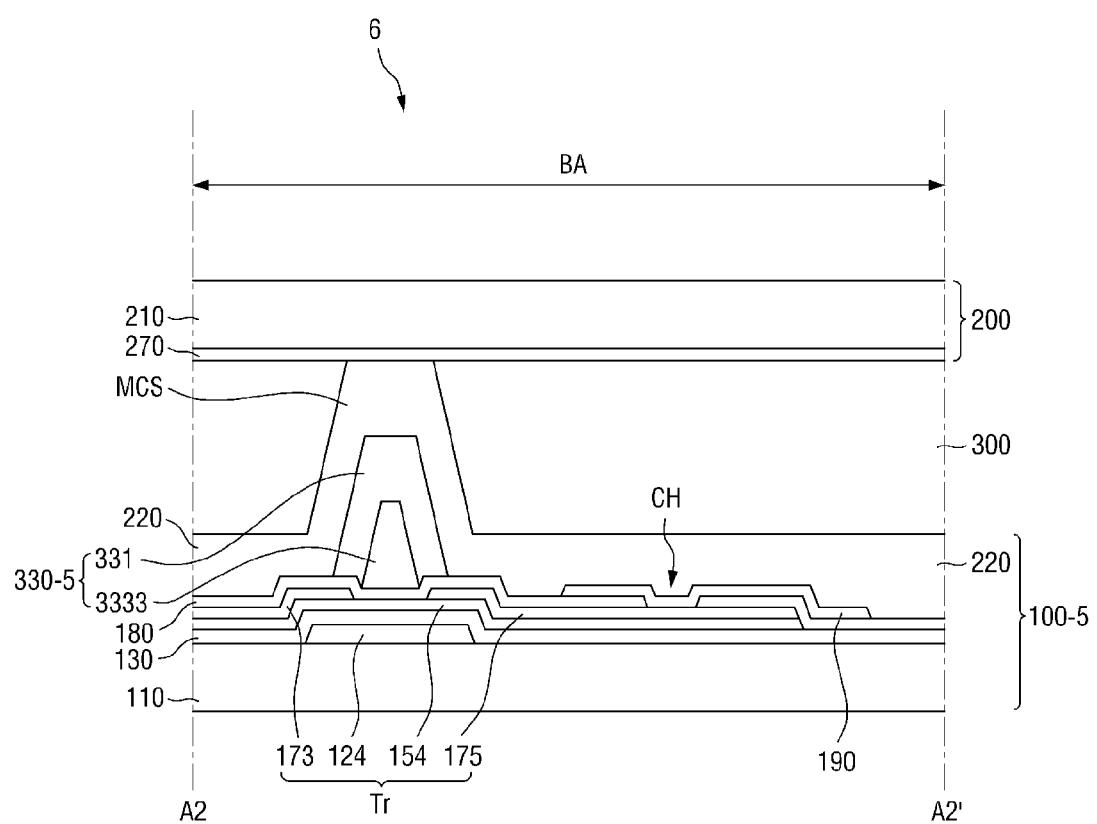
FIG. 43 is a sectional view of a display device according to still another embodiment of the present disclosure, taken along the line A2-A2' of FIG. 24.
Figure 44:
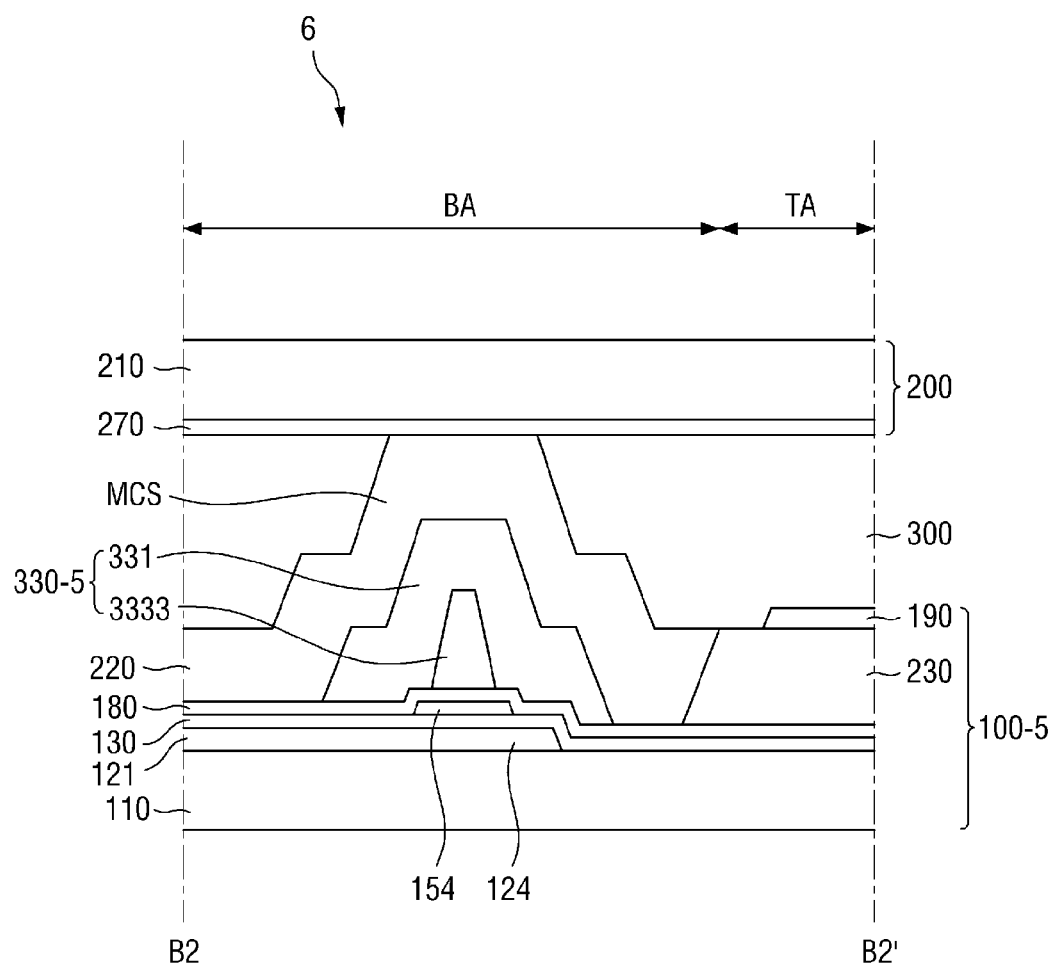
FIG. 44 is a sectional view of a display device according to still another embodiment of the present disclosure, taken along the line B2-B2' of FIG. 24.

FIG. 43 is a sectional view of a display device according to still another embodiment of the present disclosure, taken along the line A2-A2' of FIG. 24; and FIG. 44 is a sectional view of a display device according to still another embodiment of the present disclosure, taken along the line B2-B2' of FIG. 24.

Referring to FIGS. 43 and 44, the display device 6 according to this embodiment may include a first display substrate 100-5, a second display substrate 200 facing the first display substrate 100-5, and a liquid crystal layer 300 disposed between the first display substrate 100-5 and the second display substrate 200.

The display device 6 is different from the aforementioned display device (5 of FIGS. 24, 41, and 42) described with reference to FIGS. 24 to 42 in only the configuration of a projection portion 330-5, and is substantially the same as or similar to the aforementioned display device 5 in other configurations. Therefore, the repeated description of the constituent elements may be omitted, and differences will be mainly described below.

The projection portion 330-5 may include a first sub-color filter 331 and a second sub-color filter 3333. The second sub-color filter 3333 may be disposed on the passivation layer 180, and at least a part of the first sub-color filter 331 may be disposed on the second sub-color filter 3333. That is, in this embodiment, the projection portion 330-5 is different from the aforementioned projection portion 330-4 of FIGS. 24, 41, and 42 in only the disposition order of the first sub-color filter 331 and the second sub-color filter 3333, and is substantially the same as the aforementioned projection portion 330-4 in other configurations.

Figure 45:
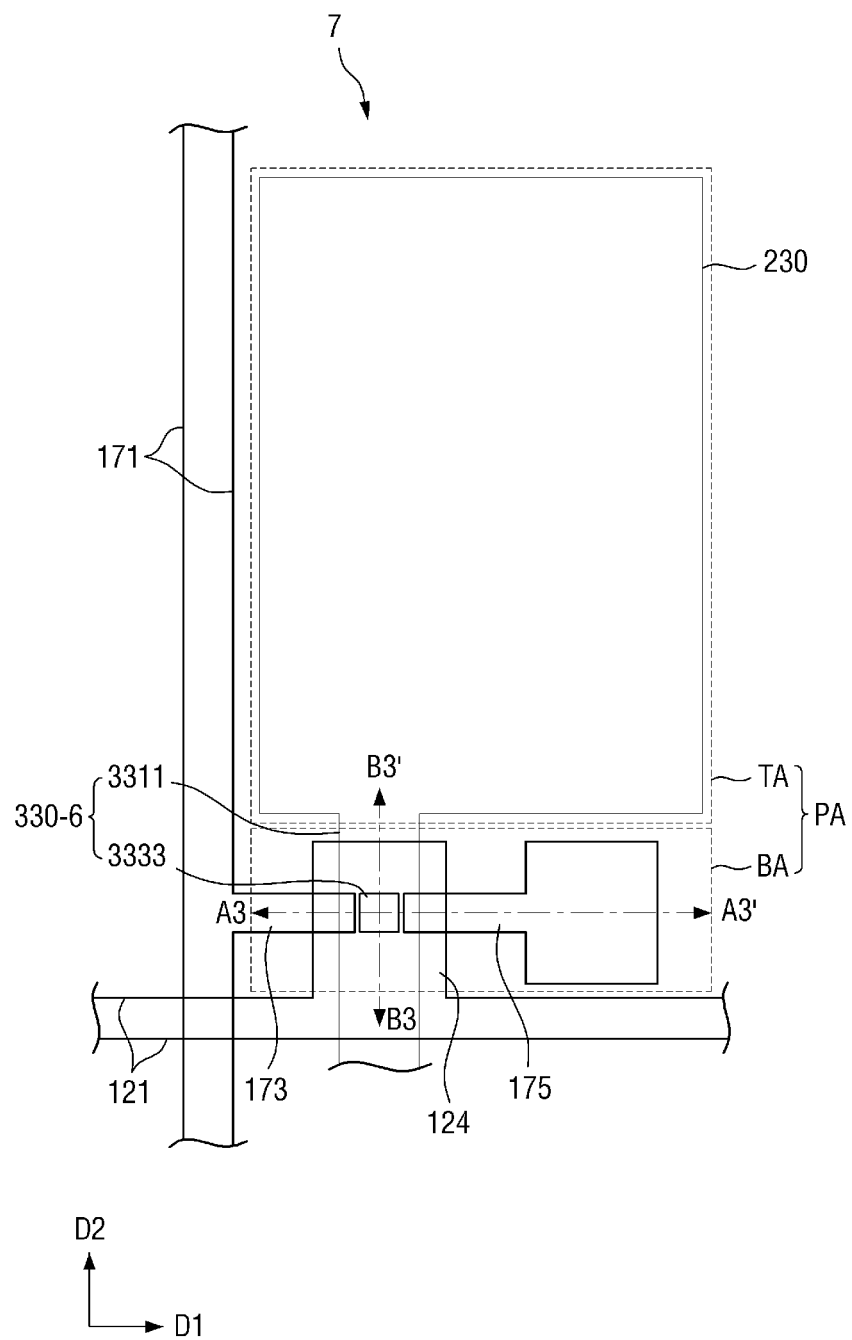
FIG. 45 is a plan view schematically showing the arrangement relationship among a color filter, a projection portion, a gate line, and a data line in the display device according to still another embodiment of the present disclosure.
Figure 46:
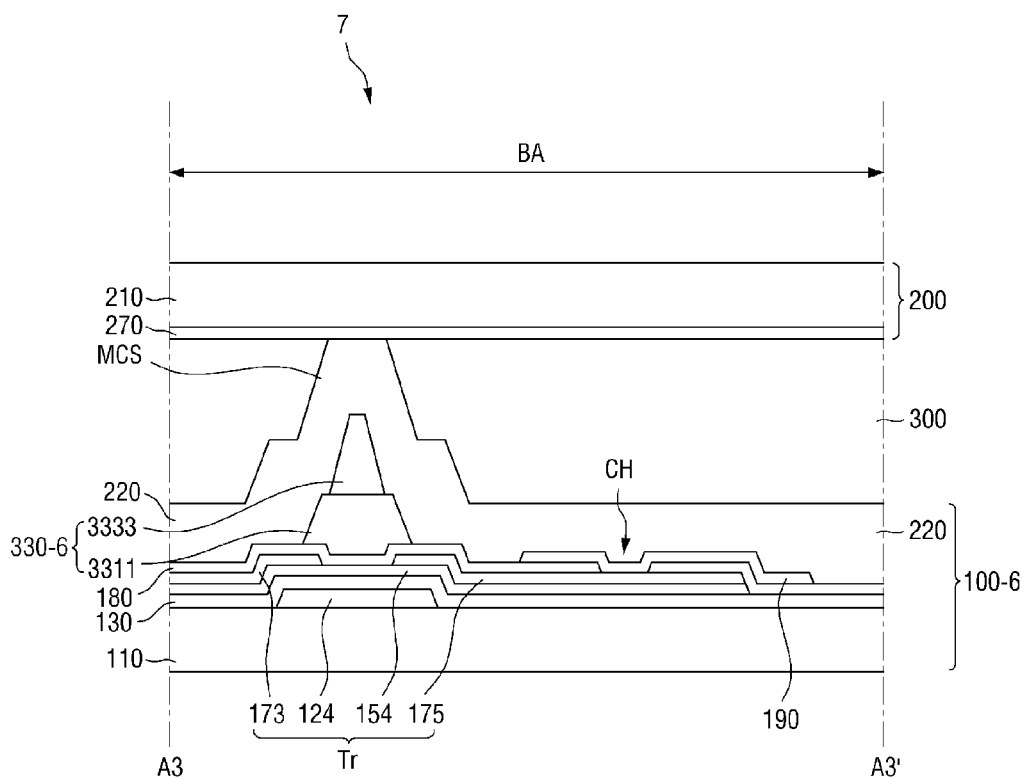
FIG. 46 is a sectional view of a display device according to still another embodiment of the present disclosure, taken along the line A3-A3' of FIG. 45.

FIG. 45 is a plan view schematically showing the arrangement relationship among a color filter, a projection portion, a gate line, and a data line in the display device according to still another embodiment of the present disclosure; FIG. 46 is a sectional view of a display device according to still another embodiment of the present disclosure, taken along the line A3-A3' of FIG. 45; and FIG. 47 is a sectional view of a display device according to still another embodiment of the present disclosure, taken along the line B3-B3' of FIG. 45.

Figure 47:
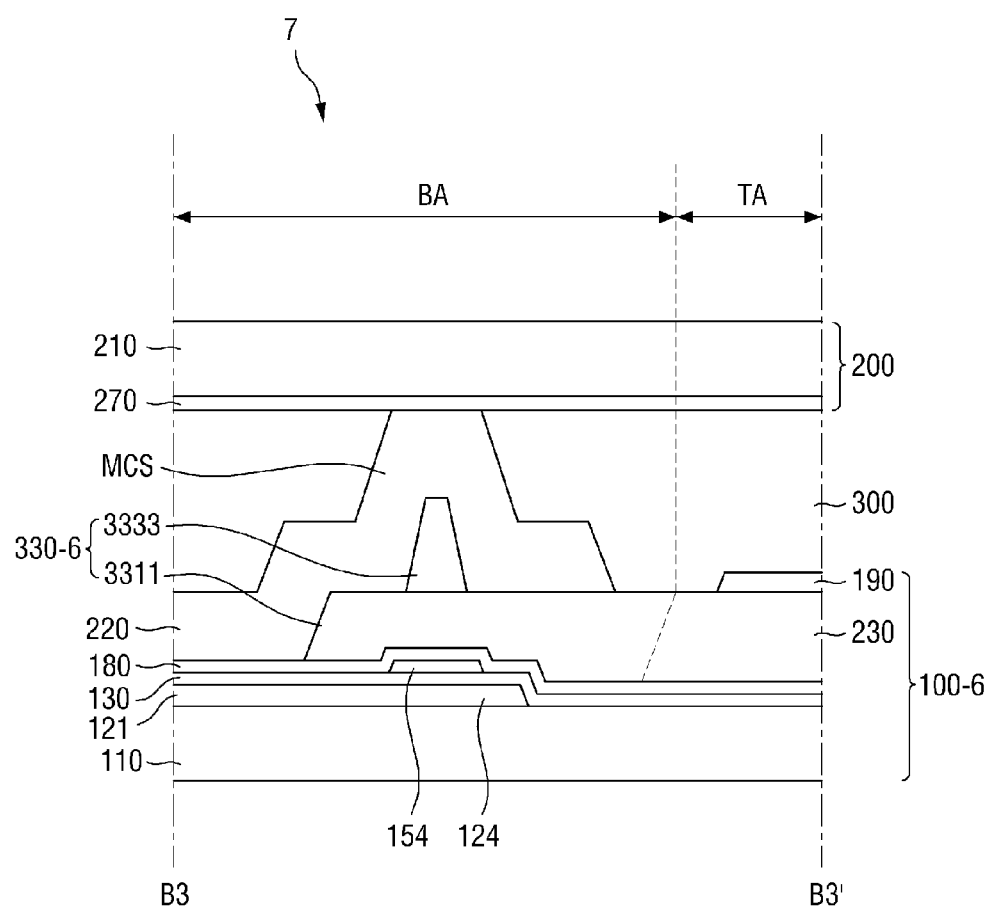
FIG. 47 is a sectional view of a display device according to still another embodiment of the present disclosure, taken along the line B3-B3' of FIG. 45.

Referring to FIGS. 45 to 47, the display device 7 according to this embodiment may include a first display substrate 100-6, a second display substrate 200 facing the first display substrate 100-6, and a liquid crystal layer 300 disposed between the first display substrate 100-6 and the second display substrate 200.

The display device 7 is different from the aforementioned display device 5 of FIGS. 24, 41, and 42 in that the shape of a projection portion 330-6 is different from the shape of the aforementioned projection portion 330-4, and is substantially the same as or similar to the aforementioned display device 5 in other configurations.

The projection portion 330-6 may include a first sub-color filter 3311 and a second sub-color filter 3333 that face each other, and the first sub-color filter 3311 may be connected with the color filter 230 along the second direction D2 without being spaced from the color filter 230.

The first sub-color filter 3311 may be disposed on the passivation layer 180, and the second sub-color filter 3333 may be disposed on the first sub-color filter 3311. Besides, a more detailed description of the first sub-color filter 3311 is substantially the same as that described with reference to FIGS. 19 to 21.

Figure 48:
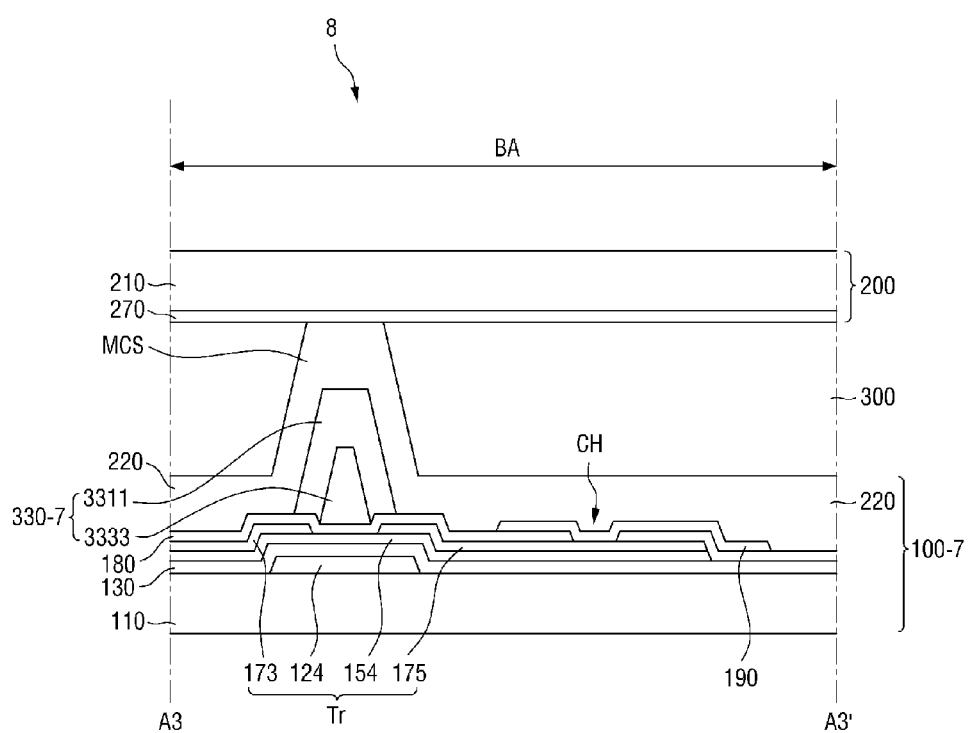
FIG. 48 is a sectional view of a display device according to still another embodiment of the present disclosure, taken along the line A3-A3' of FIG. 45.
Figure 49:
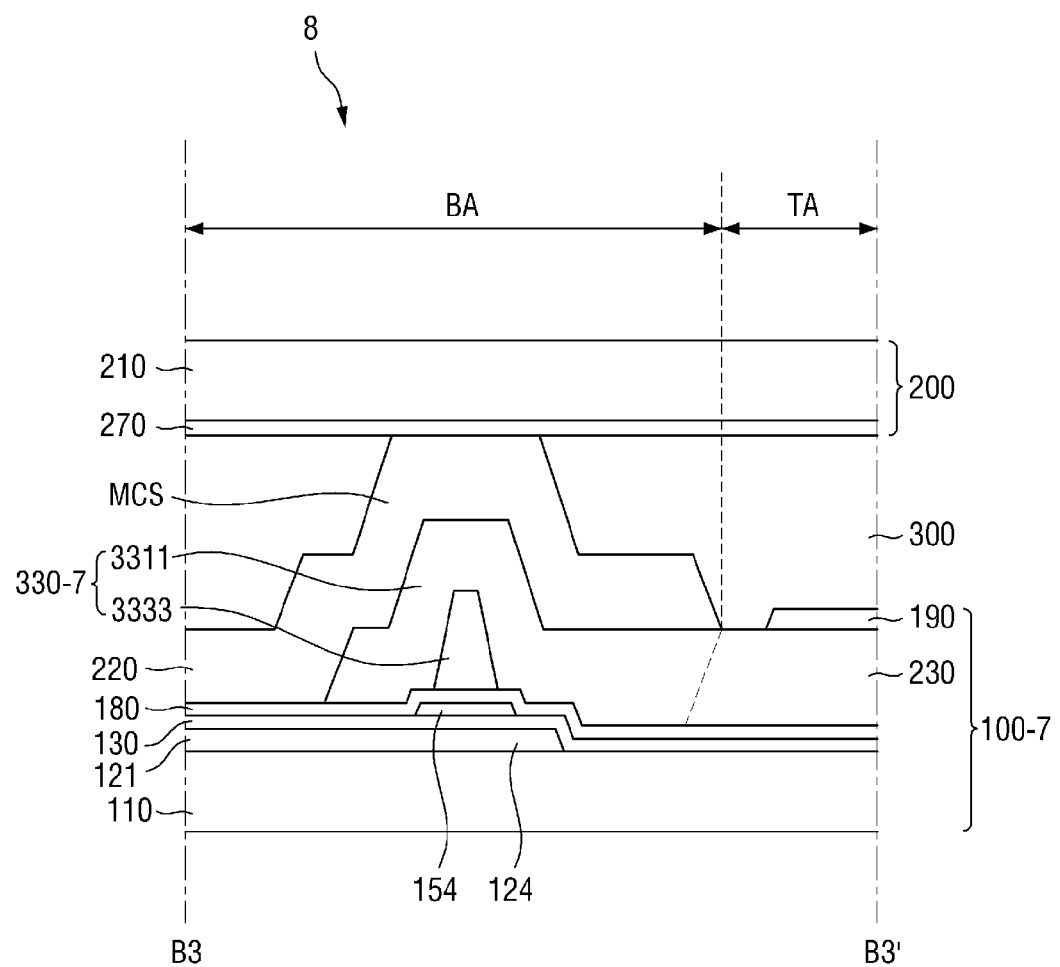
FIG. 49 is a sectional view of a display device according to still another embodiment of the present disclosure, taken along the line B3-B3' of FIG. 45.

FIG. 48 is a sectional view of a display device according to still another embodiment of the present disclosure, taken along the line A3-A3' of FIG. 45; and FIG. 49 is a sectional view of a display device according to still another embodiment of the present disclosure, taken along the line B3-B3' of FIG. 45.

Referring to FIGS. 48 and 49, the display device 8 according to this embodiment may include a first display substrate 100-7, a second display substrate 200 facing the first display substrate 100-7, and a liquid crystal layer 300 disposed between the first display substrate 100-7 and the second display substrate 200.

The display device 8 is different from the aforementioned display device 7 of FIGS. 45 to 47 in that the shape of a projection portion 330-7 is different from the shape of the aforementioned projection portion 330-6, and is substantially the same as or similar to the aforementioned display device 7 in other configurations.

The projection portion 330-7 may include a first sub-color filter 3311 and a second sub-color filter 3333. The second sub-color filter 3333 may be disposed on the passivation layer 180, and at least a part of the first sub-color filter 3311 may be disposed on the second sub-color filter 3333. That is, in this embodiment, the projection portion 330-7 is different from the aforementioned projection portion 330-6 of FIGS. 45 to 47 in only the disposition order of the first sub-color filter 3311 and the second sub-color filter 3333, and is substantially the same as the aforementioned projection portion 330-6 in other configurations.

Figure 50:
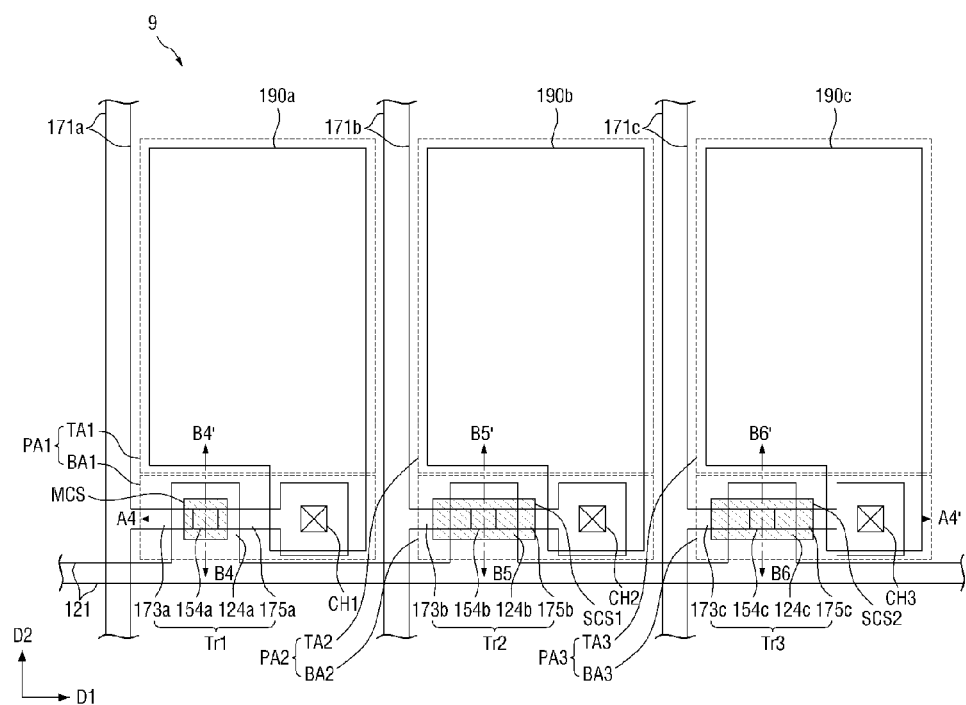
FIG. 50 is a plan view schematically showing three pixels of a display device according to still another embodiment of the present disclosure.
Figure 51:
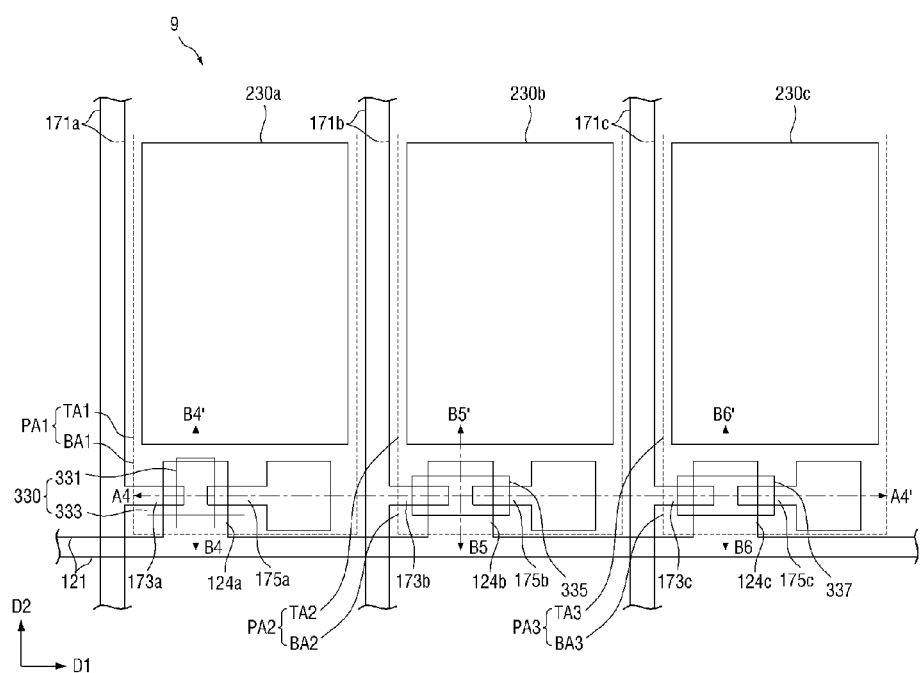
FIG. 51 is a plan view schematically showing the arrangement relationship among a color filter, a projection portion, a gate line, and a data line in the display device shown in FIG. 50.
Figure 52:
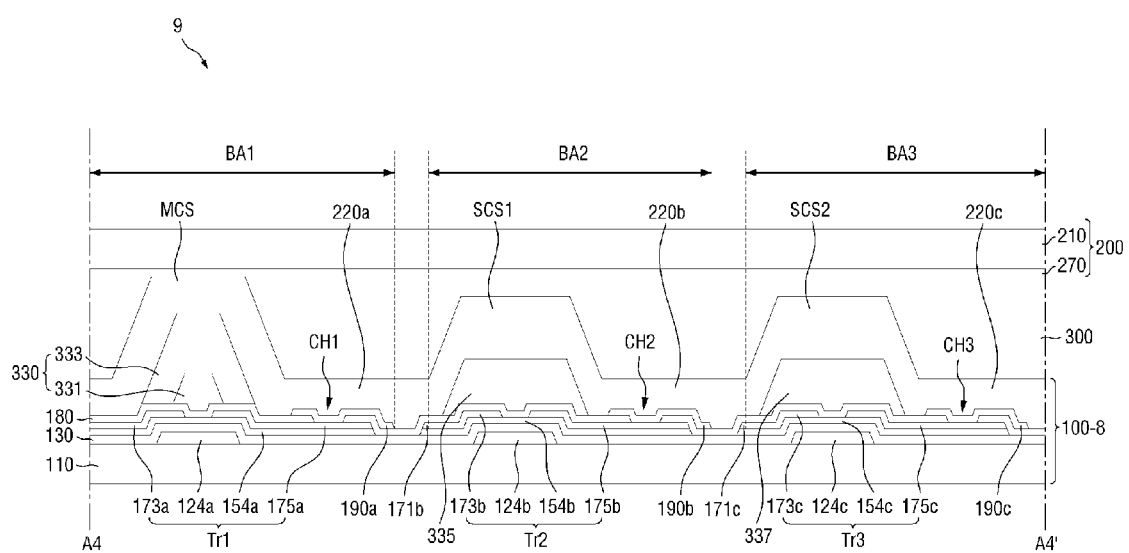
FIG. 52 is a sectional view of the display device taken along the line A4-A4' of FIG. 51.
Figure 53:
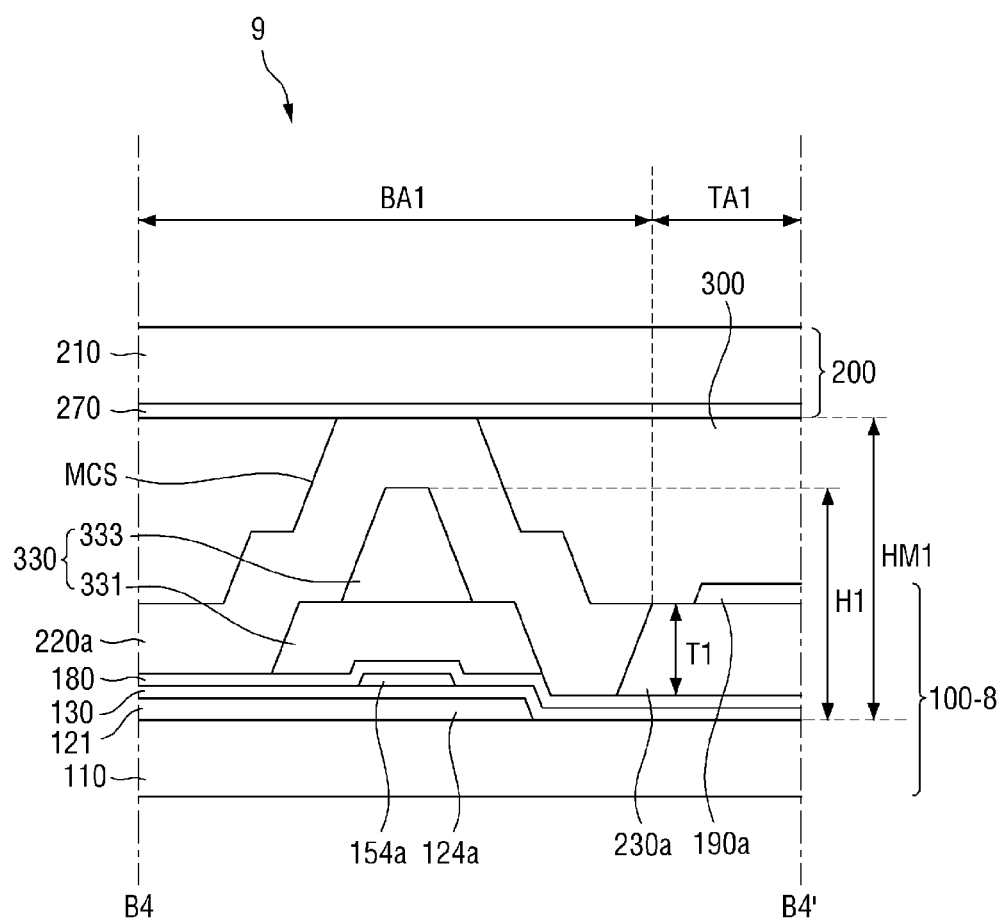
FIG. 53 is a sectional view of the display device taken along the line B4-B4' of FIG. 51.
Figure 54:
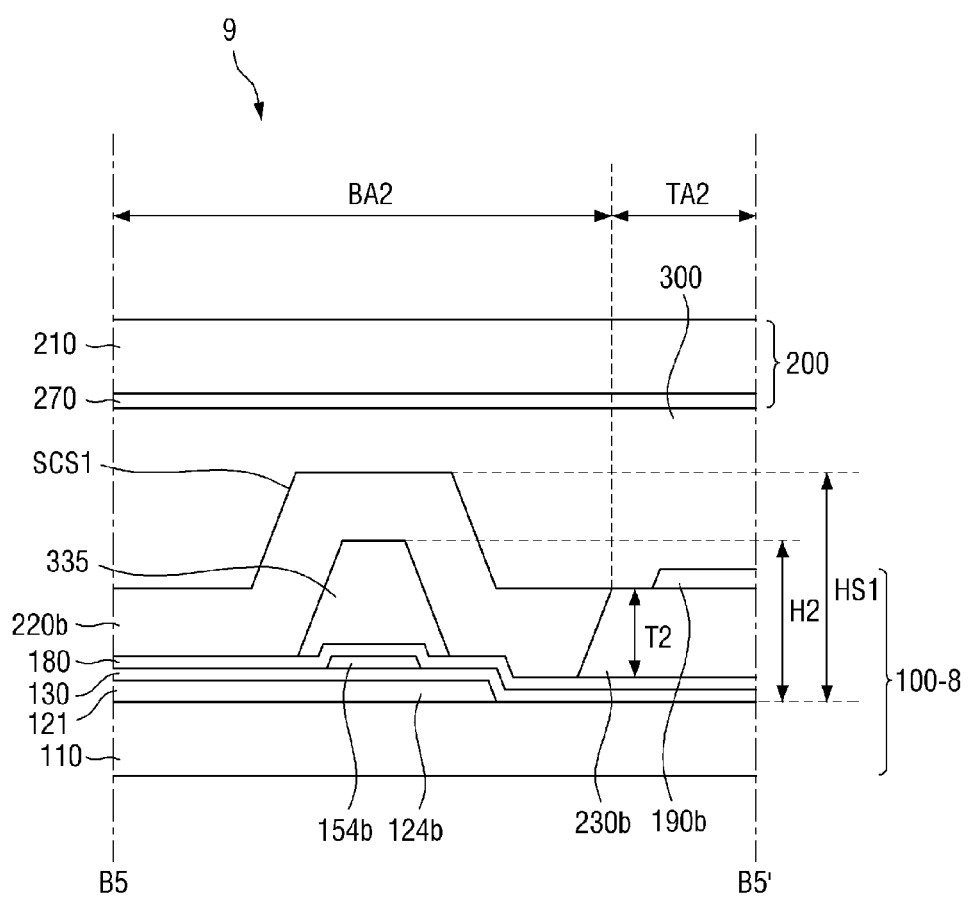
FIG. 54 is a sectional view of the display device taken along the line B5-B5' of FIG. 51.
Figure 55:
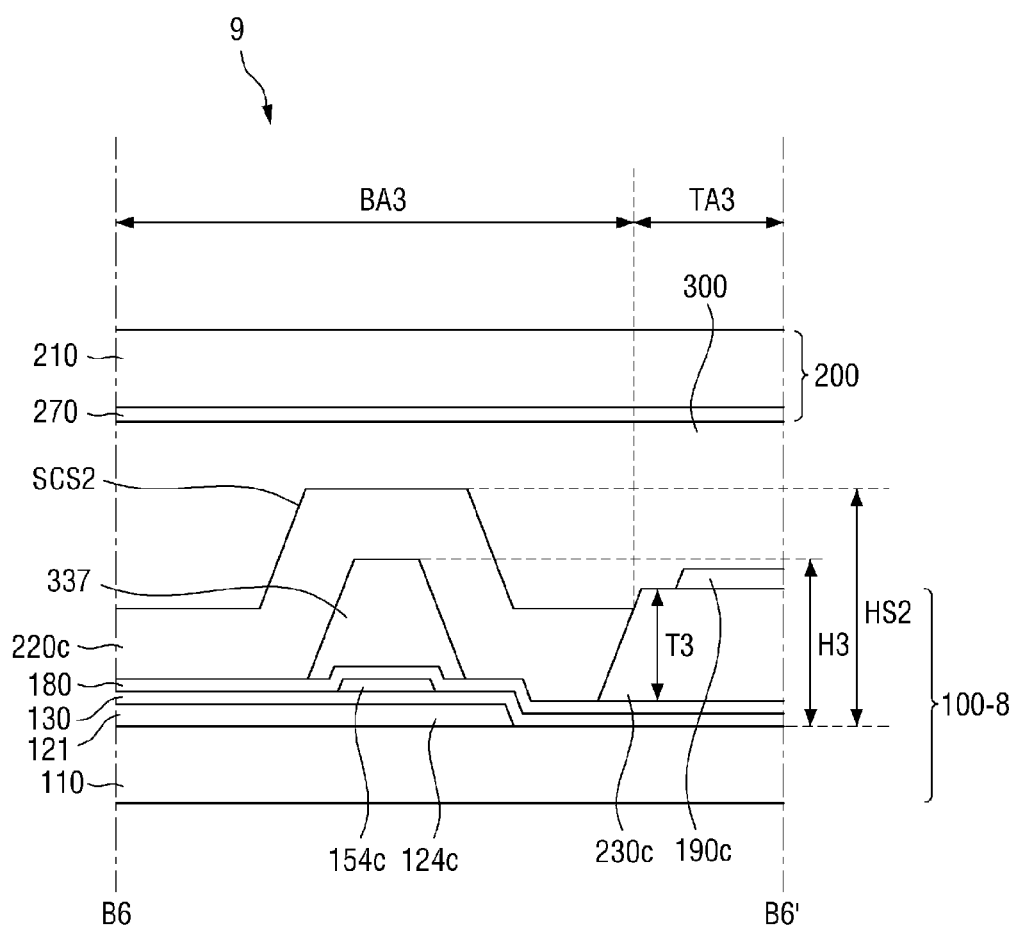
FIG. 55 is a sectional view of the display device taken along the line B6-B6' of FIG. 51.

FIG. 50 is a plan view schematically showing three pixels of a display device according to still another embodiment of the present disclosure; FIG. 51 is a plan view schematically showing the arrangement relationship among a color filter, a projection portion, a gate line, and a data line in the display device shown in FIG. 50; FIG. 52 is a sectional view of the display device taken along the line A4-A4' of FIG. 51; FIG. 53 is a sectional view of the display device taken along the line B4-B4' of FIG. 51; FIG. 54 is a sectional view of the display device taken along the line B5-B5' of FIG. 51; and FIG. 55 is a sectional view of the display device taken along the line B6-B6' of FIG. 51.

Referring to FIGS. 50 to 55, the display device 9 according to this embodiment may include a first display substrate 100-8, a second display substrate 200 facing the first display substrate 100-8, and a liquid crystal layer 300 disposed between the first display substrate 100-8 and the second display substrate 200.

Hereinafter, the repeated description of the constituent elements may be abbreviated or omitted, and differences will be mainly described.

Hereinafter, the first display substrate 100-8 will be described.

The first display substrate 100-8 may include a first base portion 110. The first base portion 110 may be an insulation plate.

The first base portion 110 may include a first pixel area PA1, a second pixel area PA2, and a third pixel area PA3 that are sequentially disposed along the first direction D1. The first pixel area PA1 may include a first light-transmitting area TA1 and a first light-blocking area BA1. The second pixel area PA2 may include a second light-transmitting area TA2 and a second light-blocking area BA2. The third pixel area PA3 may include a third light-transmitting area TA3 and a third light-blocking area BA3.

A gate line 121, a first gate electrode 124a, a second gate electrode 124b, and a third gate electrode 124c may be disposed on the first base portion 110. The gate line 121 may transmit a gate signal, and may extend mainly in the horizontal direction or the first direction (D1 direction). The first gate electrode 124a, the second gate electrode 124b, and the third gate electrode 124c may protrude from the gate line 121, and may be connected to the gate line 121. The first gate electrode 124a may overlap the first light-blocking area BA1, the second gate electrode 124b may overlap the second light-blocking area BA2, and the third gate electrode 124c may overlap the third light-blocking area BA3.

A gate insulation layer 130 may be disposed on the gate line 121, the first gate electrode 124a, the second gate electrode 124b, and the third gate electrode 124c.

A first semiconductor layer 154a overlapping the first gate electrode 124a, a second semiconductor layer 154b overlapping the second gate electrode 124b, and a third semiconductor layer 154c overlapping the third gate electrode 124c may be disposed on the gate insulation film 130.

A first data line 171a, a second data line 171b, and a third data line 171c that are insulated from the gate line 121 and extend in the second direction (D2 direction) may be disposed on the gate insulation film 130. The first data line 171a may intersect the gate line 121 to define the first pixel area PA1. The second data line 171b may intersect the gate line 121 to define the second pixel area PA2. The third data line 171c may intersect the gate line 121 to define the third pixel area PA3.

A first source electrode 173a connected with the first data line 171a and a first drain electrode 175a spaced from the first source electrode 173a may be disposed on the first semiconductor layer 154a. A second source electrode 173b connected with the second data line 171b and a second drain electrode 175b spaced from the second source electrode 173b may be disposed on the second semiconductor layer 154b. A third source electrode 173c connected with the third data line 171c and a third drain electrode 175c spaced from the third source electrode 173c may be disposed on the third semiconductor layer 154c.

The first gate electrode 124a, the first source electrode 173a, and the first drain electrode 175a, and the first semiconductor layer 154a may form a first thin film transistor Tr1. The second gate electrode 124b, the second source electrode 173b, the second drain electrode 175b, and the second semiconductor layer 154b may form a second thin film transistor Tr2. The third gate electrode 124c, the third source electrode 173c, the third drain electrode 175c, and the third semiconductor layer 154c may form a third thin film transistor Tr3.

The first thin film transistor Tr1 may be disposed to overlap the first light-blocking area BA1, the second thin film transistor Tr2 may be disposed to overlap the second light-blocking area BA2, and the third thin film transistor Tr3 may be disposed to overlap the third light-blocking area BA3.

A passivation layer 180 may be disposed on the first thin film transistor Tr1, the second thin film transistor Tr2, and the third thin film transistor Tr3.

A first contact hole CH1 exposing the first drain electrode 175a, a second contact hole CH2 exposing the second drain electrode 175b, and a third contact hole CH2 exposing the third drain electrode 175c may be formed in the passivation layer 180.

A first color filter 230a overlapping the first light-transmitting area TA1, a second color filter 230b overlapping the second light-transmitting area TA2, and a third color filter 230c overlapping the third light-transmitting area TA3 may be disposed on the passivation layer 180. In some embodiments, the first color filter 230a may not overlap the first contact hole CH1, the second color filter 230b may not overlap the second contact hole CH2, and the third color filter 230c may not overlap the third contact hole CH3. The first color filter 230a, the second color filter 230b, and the third color filter 230c may contain different color pigments, respectively. Hereinafter, for convenience of explanation, an exemplary case is shown where the first color filter 230a is a red filer containing a red pigment, the second color filter 230b is a green filter containing a green pigment, and the third color filter 230a is a blue filter containing a blue pigment, but the present disclosure is not limited thereto. When the third color filter 230c is a blue filter, the thickness T3 of the third color filter 230c may be greater than the thickness T1 of the first color filter 230a or the thickness T2 of the second color filter 230b.

A first pixel electrode 190a overlapping the first light-transmitting area TA1 and connected with the first drain electrode 175a through the first contact hole CH1 may be disposed on the first color filter 230a. A second pixel electrode 190b overlapping the second light-transmitting area TA2 and connected with the second drain electrode 175b through the second contact hole CH2 may be disposed on the second color filter 230b. A third pixel electrode 190c overlapping the third light-transmitting area TA3 and connected with the third drain electrode 175c through the third contact hole CH3 may be disposed on the third color filter 230c.

A projection portion 330 overlapping the first light-blocking area BA1 may be disposed on the passivation layer 180. In some embodiments, the projection portion 330 may be disposed to overlap the first thin film transistor Tr1.

The projection portion 330 may include a first sub-color filter 331 and a second sub-color filter 333 overlapping the first sub-color filter 331. Descriptions of the first sub-color filter 331 and the second sub-color filter 333 are substantially the same as those described with reference to FIGS. 1 to 16.

The first sub-color filter 331 may be made of a photosensitive organic insulation material, and may further contain a first color pigment. The second sub-color filter 333 may be made of a photosensitive organic insulation material, and may further contain a second color pigment that is different from the first color pigment of the first sub-color filter 331. For example, when the first sub-color filter 331 contains a red pigment as the first color pigment, the second sub-color filter 333 may contain a blue pigment as the second color pigment.

A third sub-color filter 335 overlapping the second light-blocking area BA2 and a fourth sub-color filter 337 overlapping the third light-blocking area BA3 may be disposed on the passivation layer 180. In some embodiments, the third sub-color filter 335 may be disposed to overlap the second thin film transistor Tr2, and the fourth sub-color filter 337 may be disposed to overlap the third thin film transistor Tr3.

The third sub-color filter 335 may be made of a photosensitive organic insulation material, and may further contain a color pigment. For example, the third sub-color filter 335 may contain any one of a red pigment, a green pigment, and a blue pigment. In some embodiments, the third sub-color filter 335 may contain a different color pigment from the second color filter 230b, and may contain the same color pigment as the second sub-color filter 333, for example, a blue pigment. In this case, the second sub-color filter 333, the third color filter 230c, and the third sub-color filter 335 may be formed simultaneously using the same mask. In other some embodiments, the third sub-color filter 335 may contain the same color pigment as the second color filter 230b, and may contain a different color pigment from the second sub-color filter 333 and the first sub-color filter 331, for example, a green pigment. In this case, the thickness of the third sub-color filter 335 may be adjusted independently according to the thickness of the first sub-color filter 331 and the thickness of the second sub-color filter 333, and thus the height of the spacing member MCS and the first subsidiary spacing member (SCS1), which will be described later, may be independently adjusted.

Meanwhile, the fourth sub-color filter 337 may be made of a photosensitive organic insulation material, and may further contain a color pigment. In some embodiments, the fourth sub-color filter 337 may contain the same color pigment as the third color filter 230c and the third sub-color filter 335, for example, a blue pigment. In this case, the second sub-color filter 333, the third color filter 230c, the third sub-color filter 335, and the fourth sub-color filter 337 may be formed simultaneously using the same mask. In other some embodiments, the fourth sub-color filter 337 may contain a color pigment different from that of the third color filter 230c and the same as that of the third sub-color filter 335, for example, a green pigment. In this case, the thickness of the fourth sub-color filter 337 may be adjusted independently according to the thickness of the first sub-color filter 331 and the thickness of the second sub-color filter 333, and thus the height of the spacing member MCS and the first subsidiary spacing member (SCS1), which will be described later, may be independently adjusted.

When the display device 9 includes a red filter, a green filter, and a blue filter, examples of combinations of color pigments in the first sub-color filter 331, the second sub-color filter 333, the third sub-color filter 335, and the fourth sub-color filter 337 are as follows. Each of the following parentheses means one color pigment combination. In each the parentheses, the first color pigment of the first sub-color filter 331, the second color pigment of the second sub-color filter 333, the color pigment of the third sub-color filter 335, and the color pigment of the fourth sub-color filter 337 are sequentially described. Here, R is a red pigment, G is a green pigment, and B is a blue pigment.

(R, G, R, R), (R, G, R, G), (R, G, R, B), (R, G, G, R), (R, G, G, G), (R, G, G, B), (R, G, B, R), (R, G, B, G), (R, G, B, B), (R, B, R, R), (R, B, R, G), (R, B, R, B), (R, B, G, R), (R, B, G, G), (R, B, G, B), (R, B, B, R), (R, B, B, G), (R, B, B, B), (G, R, R, R), (G, R, R, G), (G, R, R, B), (G, R, G, R), (G, R, G, G), (G, R, G, B), (G, R, B, R), (G, R, B, G), (G, R, B, B), (G, B, R, R), (G, B, R, G), (G, B, R, B), (G, B, G, R), (G, B, G, G), (G, B, G, B), (G, B, B, R), (G, B, B, G), (G, B, B, B)

In some embodiments, as described above, the color pigment contained in the first color filter 230a may be the same as the first color pigment of the first sub-color filter 331 or the second color pigment of the second sub-color filter 333. In other some embodiments, the color pigment contained in the first color filter 230a may be a third color pigment that is different from the first color pigment of the first sub-color filter 331 and the second color pigment of the second sub-color filter 333.

The second color filter 230b adjacent to the first color filter 230a may contain a color pigment different from that of the first color filter 230a.

When the display device 9 includes a red filter, a green filter, and a blue filter, examples of combinations of color pigments in the first sub-color filter 331, the second sub-color filter 333, the third sub-color filter 335, the first color filter 230a, and the second color filter 230b are as follows. Each of the following parentheses means one color pigment combination. In each the parentheses, the first color pigment of the first sub-color filter 331, the second color pigment of the second sub-color filter 333, the color pigment of the third sub-color filter 335, the color pigment of the first color filter 230a, and the color pigment of the second color filter 230b are sequentially described. Here, R is a red pigment, G is a green pigment, and B is a blue pigment.

(R, G, R, R, G), (R, G, R, R, B), (R, G, R, G, R), (R, G, R, G, B), (R, G, R, B, R), (R, G, R, B, G), (R, G, G, R, G), (R, G, G, R, B), (R, G, G, G, R), (R, G, G, G, B), (R, G, G, B, R), (R, G, G, B, G), (R, G, B, R, G), (R, G, B, R, B), (R, G, B, G, R), (R, G, B, G, B), (R, G, B, B, R), (R, G, B, B, G), (R, B, R, R, G), (R, B, R, R, B), (R, B, R, G, R), (R, B, R, G, B), (R, B, R, B, R), (R, B, R, B, G), (R, B, G, R, G), (R, B, G, R, B), (R, B, G, G, R), (R, B, G, G, B), (R, B, G, B, R), (R, B, G, B, G), (R, B, B, R, G), (R, B, B, R, B), (R, B, B, G, R), (R, B, B, G, B), (R, B, B, B, R), (R, B, B, B, G), (G, R, R, R, G), (G, R, R, R, B), (G, R, R, G, R), (G, R, R, G, B), (G, R, R, B, R), (G, R, R, B, G), (G, R, G, R, G), (G, R, G, R, B), (G, R, G, G, R), (G, R, G, G, B), (G, R, G, B, R), (G, R, G, B, G), (G, R, B, R, G), (G, R, B, R, B), (G, R, B, G, R), (G, R, B, G, B), (G, R, B, B, R), (G, R, B, B, G), (G, B, R, R, G), (G, B, R, R, B), (G, B, R, G, R), (G, B, R, G, B), (G, B, R, B, R), (G, B, R, B, G), (G, B, G, R, G), (G, B, G, R, B), (G, B, G, G, R), (G, B, G, G, B), (G, B, G, B, R), (G, B, G, B, G), (G, B, B, R, G), (G, B, B, R, B), (G, B, B, G, R), (G, B, B, G, B), (G, B, B, B, R), (G, B, B, B, G)

The projection portion 330 includes two sub-color filters, that is, the first sub-color filter 331 and the second sub-color filter 333. The height H1 of the projection portion 330 measured based on one surface of the first base portion 110 may be greater than the height H2 of the third sub-color filter 335 or the height H3 of the fourth sub-color filter 337 measured based on one surface of the first base portion 110.

A first light-blocking member 220a overlapping the first light-blocking area BA1 may be disposed on the projection portion 330 and the passivation layer 180. The first light-blocking member 220a may extend along the first direction D1 to cover the entire first light-blocking area BA1. As described above, the first color filter 230a may not overlap the first light-blocking area BA1. Therefore, the first light-blocking member 220a may be partially in direct contact with the passivation layer 180.

A spacing member MCS may be disposed on the first light-blocking member 220a. The spacing member MCS that is in contact with the second display substrate 200 serves to maintain a gap between the first display substrate 100 and the second display substrate 200 as a main column spacer.

The spacing member MCS may overlap the projection portion 330, and may contain a light-blocking material. In some embodiments, the spacing member MCS may be made of the same material as the first light-blocking member 220a, and may be integrated with the first light-blocking member 220a.

A second light-blocking member 220b overlapping the second light-blocking area BA2 may be disposed on the passivation layer 180. The second light-blocking member 220b may extend along the first direction D1 to cover the entire second light-blocking area BA2. The second color filter 230b may not overlap the second light-blocking area BA2. Therefore, the second light-blocking member 220b may be partially in direct contact with the passivation layer 180.

A first subsidiary spacing member SCS1 may be disposed on the second light-blocking member 220b. The first subsidiary spacing member SCS1 may be spaced from the second display substrate 200, and serve to maintain the gap between the second display substrate 200 and the first display substrate 100 in addition to the spacing member MCS. That is, the first subsidiary spacing member SCS1 may function as a subsidiary column spacer.

The first subsidiary spacing member SCS1 may overlap the third sub-color filter 335, and may contain a light-blocking material. In some embodiments, the first subsidiary spacing member SCS1 may be made of the same material as the second light-blocking member 220b, and may be integrated with the second light-blocking member 220b.

A third light-blocking member 220c overlapping the third light-blocking area BA3 may be disposed on the passivation layer 180. The third light-blocking member 220c may extend along the first direction D1 to cover the entire third light-blocking area BA3. The third color filter 230c may not overlap the third light-blocking area BA3. Therefore, the third light-blocking member 220c may be partially in direct contact with the passivation layer 180.

A second subsidiary spacing member SCS2 may be disposed on the third light-blocking member 220c. The second subsidiary spacing member SCS2 may overlap the fourth sub-color filter 337. The second subsidiary spacing member SCS2 may contain a light-blocking material. In some embodiments, the second subsidiary spacing member SCS2 may be made of the same material as the third light-blocking member 220c, and may be integrated with the third light-blocking member 220c.

According to one embodiment, the spacing member MCS is in contact with the second display substrate 200 and the first subsidiary spacing member SCS1 and the second subsidiary spacing member SCS2 are spaced from the second display substrate 200. In this case, the height of the spacing member MCS may be greater than the height of the first subsidiary spacing member SCS1 or the height of the second subsidiary spacing member SCS2. For example, the height HM1 of the spacing member MCS measured based on one surface of the first base portion 110 may be greater than the height HS1 of the first subsidiary spacing member SCS1 or the height HS2 of the second subsidiary spacing member SCS2 measured based on one surface of the first base portion 110.

The first light-blocking member 220a, the second light-blocking member 220b, and the third light-blocking member 220c may be made of the same material, and may be connected to each other along the first direction D1. The first light-blocking member 220a, the second light-blocking member 220b, and the third light-blocking member 220c may be integrated with each other, and may be simultaneously formed during the same process.

The projection portion 330 overlapping the first light-blocking area BA1 includes the first sub-color filter 331 and the second sub-color filter 333, and the first light-blocking member 220a is provided with a step formed by the projection portion 330. The thickness of the third sub-color filter 335 overlapping the second light-blocking area BA2 and the height of the third sub-color filter 335 measured based on one surface of the first base portion 110 are smaller than the thickness and height of the projection portion 330. Similarly, the thickness of the fourth sub-color filter 337 overlapping the third light-blocking area BA3 and the height of the fourth sub-color filter 337 measured based on one surface of the first base portion 110 are smaller than the thickness and height of the projection portion 330. The first subsidiary spacing member SCS1 is formed on the third sub-color filter 335 in a process of forming the second light-blocking member 220b, and the second subsidiary spacing member SCS2 is formed on the fourth sub-color filter 337 in a process of forming the third light-blocking member 220c. The height of the first subsidiary spacing member SCS1 and the height of the second subsidiary spacing member SCS2, respectively measured based on one surface of the first base portion 110, are lower than the height of the spacing member MCS.

According to this embodiment, the first light-blocking member 220a, the second light-blocking member 220b, the third light-blocking member 220c, the spacing member MCS, the first subsidiary spacing member SCS1, and the second subsidiary spacing member SCS2 can be simultaneously formed, the third sub-color filter 335, and the fourth sub-color filter 337 are formed without an additional multi-tone mask, there is an advantage of simplifying a manufacturing process. Further, since a full-tone mask can be used without using a multi-tone mask, there is an advantage of further reducing a manufacturing cost. Moreover, when the third sub-color filter 335 and the fourth sub-color filter 337 include color pigments that are different from the color pigments of the second sub-color filter 333 and the first sub-color filter 331, the thickness of the third sub-color filter 335 and the fourth sub-color filter 337 can be adjusted independently according to the thickness of the first sub-color filter 331 and the second sub-color filter 333, and thus there is an advantage of independently adjusting the height of the first subsidiary spacing member SCS1 and the height of the second subsidiary spacing member SCS2 according to the height of the spacing member MCS.

Meanwhile, although not shown in the drawings, the projection portion 330 may be changed into the projection portion 330-1 of FIGS. 17 and 18.

Figure 56:
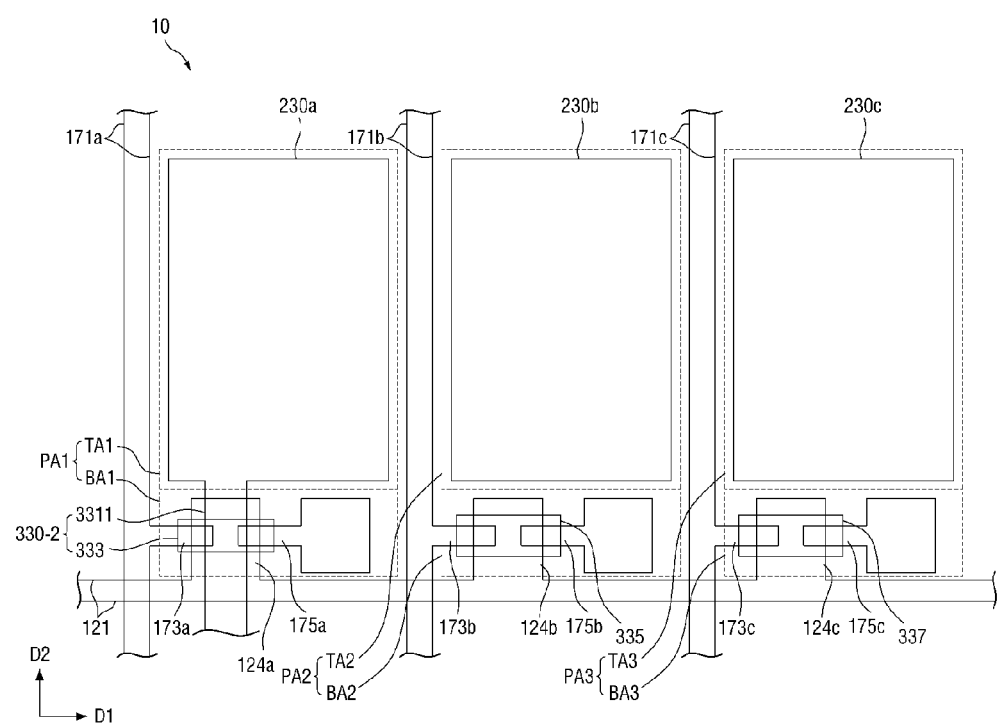
FIG. 56 is a plan view schematically showing the exemplary arrangement relationship among a color filter, a projection portion, a gate line, and a data line in the display device according to still another embodiment of the present disclosure.

FIG. 56 is a plan view schematically showing the exemplary arrangement relationship among a color filter, a projection portion, a gate line, and a data line in the display device according to still another embodiment of the present disclosure.

Referring to FIG. 56, the display device 10 is different from the aforementioned display device 9 of FIGS. 52 to 55 in that the shape of a projection portion 330-2 is different from the shape of the projection portion 330 of FIGS. FIGS. 52 to 55, and is substantially the same as or similar to the aforementioned display device 9 in other configurations. Therefore, the repeated description of the constituent elements may be omitted, and differences will be mainly described below.

The projection portion 330-2 may include a first sub-color filter 3311 and a second sub-color filter 333 that face each other, and the first sub-color filter 3311 may be connected with the first color filter 230a along the second direction D2 without being spaced from the first color filter 230a. A detailed description of the protrusion 330-2 is substantially the same as that described above with reference to FIGS. 19 to 21.

Meanwhile, although not shown in the drawings, the projection portion 330-2 may be changed into the projection portion 330-3 of FIGS. 22 and 23.

Figure 57:
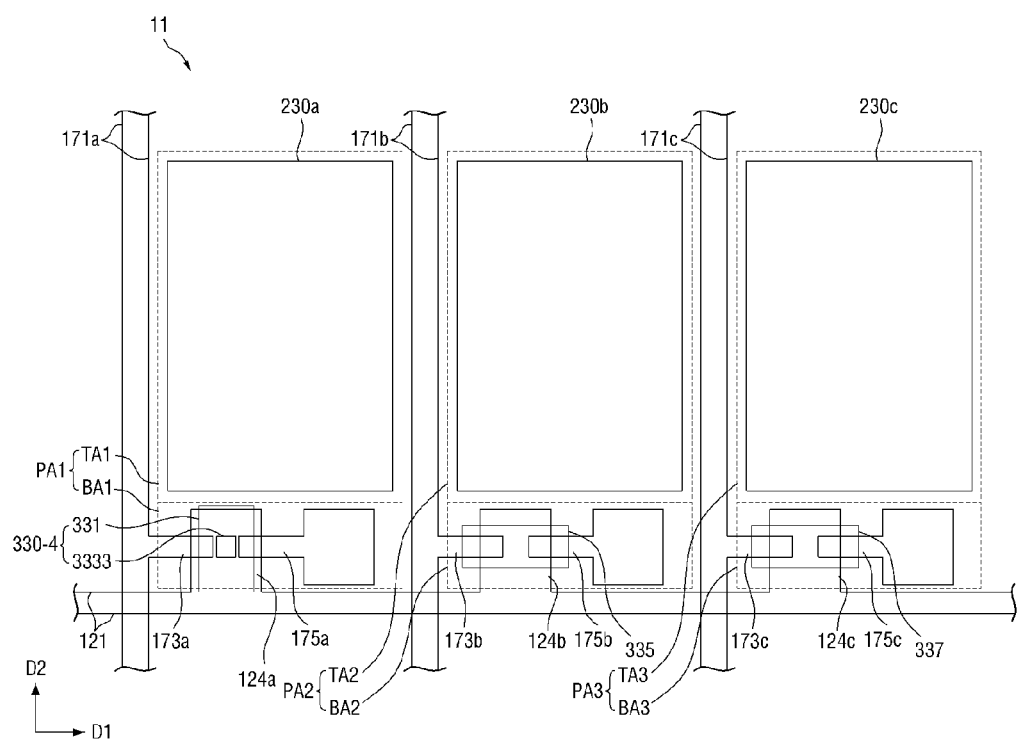
FIG. 57 is a plan view schematically showing the exemplary arrangement relationship among a color filter, a projection portion, a gate line, and a data line in the display device according to still another embodiment of the present disclosure.

FIG. 57 is a plan view schematically showing the exemplary arrangement relationship among a color filter, a projection portion, a gate line, and a data line in the display device according to still another embodiment of the present disclosure.

Referring to FIG. 57, the display device 11 is different from the aforementioned display device 9 of FIGS. 52 to 55 in that the shape of a projection portion 330-4 is different from the shape of the projection portion 330 of FIGS. FIGS. 52 to 55, and is substantially the same as or similar to the aforementioned display device 9 in other configurations. Therefore, the repeated description of the constituent elements may be omitted, and differences will be mainly described below.

The projection portion 330-4 may include a first sub-color filter 331 and a second sub-color filter 3333 that face each other. The width of the second sub-color filter 3333 in the first direction D1 may be smaller than the width of the first sub-color filter 331 in the first direction D1, and the width of the second sub-color filter 3333 in the second direction D2 may be smaller than the width of the first sub-color filter 331 in the second direction D2. A detailed description of the protrusion 330-4 is substantially the same as that described above with reference to FIGS. 24 to 42.

Meanwhile, although not shown in the drawings, the projection portion 330-4 may be changed into the projection portion 330-5 of FIGS. 43 and 44.

Figure 58:
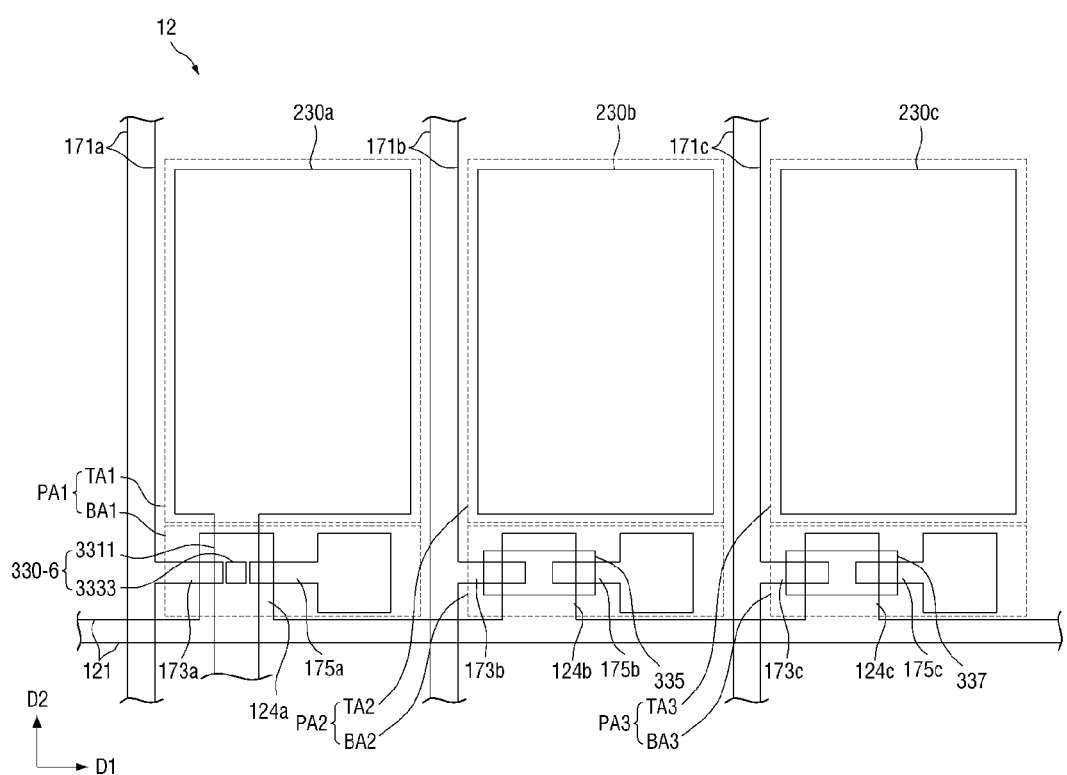
FIG. 58 is a plan view schematically showing the exemplary arrangement relationship among a color filter, a projection portion, a gate line, and a data line in the display device according to still another embodiment of the present disclosure.

FIG. 58 is a plan view schematically showing the exemplary arrangement relationship among a color filter, a projection portion, a gate line, and a data line in the display device according to still another embodiment of the present disclosure.

Referring to FIG. 58, the display device 12 is different from the aforementioned display device 9 of FIGS. 52 to 55 in that the shape of a projection portion 330-6 is different from the shape of the projection portion 330 of FIGS. FIGS. 52 to 55, and is substantially the same as or similar to the aforementioned display device 9 in other configurations. Therefore, the repeated description of the constituent elements may be omitted, and differences will be mainly described below.

The projection portion 330-6 may include a first sub-color filter 3311 and a second sub-color filter 3333 that face each other. The width of the second sub-color filter 3333 in the first direction D1 may be smaller than the width of the first sub-color filter 3311 in the first direction D1, and the width of the second sub-color filter 3333 in the second direction D2 may be smaller than the width of the first sub-color filter 3311 in the second direction D2. A detailed description of the protrusion 330-4 is substantially the same as that described above with reference to FIGS. 24 to 42. Further, the first sub-color filter 3311 may be connected with the first color filter 230a along the second direction D2 without being spaced from the first color filter 230a. A detailed description of the protrusion 330-6 is substantially the same as that described above with reference to FIGS. 45 and 47.

Meanwhile, although not shown in the drawings, the projection portion 330-6 may be changed into the projection portion 330-7 of FIGS. 48 and 49.

As described above, according to the embodiments of the present disclosure, a display device having improved transmittance and aperture ratio and simplified manufacturing process.

The effects of the present disclosure are not limited by the foregoing, and other various effects are anticipated herein.

Although the preferred embodiments of the present disclosure have been disclosed for illustrative purposes, those skilled in the art will appreciate that various modifications, additions and substitutions are possible, without departing from the scope and spirit of the present disclosure.

What is claimed is:

1. A display device, comprising:
    a base portion including a pixel area that includes a light-transmitting area and a light-blocking area;
    a projection portion disposed on the light-blocking area of the base portion, the projection portion including a first projection portion comprising a plurality of sub-color filters including a first sub-color filter and a second sub-color filter overlapping the first sub-color filter over an overlap area and a second projection portion comprising at least one of the plurality of sub-color filters;
    a light-blocking member disposed on the projection portion and overlapping the base portion; and
    a spacing member disposed on the light-blocking member, the spacing member being made of the same material as the light-blocking member and overlapping the first projection portion; and
    a subsidiary spacing member disposed on the light-blocking member, the subsidiary spacing member being made of the same material as the light-blocking member and overlapping the second projection portion,
    wherein the first sub-color filter includes a first color pigment,
    the second sub-color filter includes a second color pigment different from the first color pigment,
    a first width of the first sub-color filter in a first direction is different from a second width of the second sub-color filter in the first direction,
    a third width of the first sub-color filter in a second direction is different from a fourth width of the second sub-color filter in the second direction,
    the second direction is a direction intersecting the first direction,
    a first height of the spacing member measured based on a surface of the base portion is higher than a second height of the subsidiary spacing member measured based on the surface of the base portion, and
    wherein a number of the plurality of sub-color filters included in the first projection portion is more than a number of the at least one of the plurality of sub-color filters included in the second projection portion.

2. The display device of claim 1,
    wherein the first width is smaller than the second width, and the third width is larger than the fourth width.

3. The display device of claim 2,
    wherein a maximum width of the overlap area in the first direction is substantially equal to the first width, and
    a maximum width of the overlap area in the second direction is substantially equal to the fourth width.

4. The display device of claim 1,
    wherein the first width is larger than the second width, and the third width is larger than the fourth width.

5. The display device of claim 4,
wherein a maximum width of the overlap area in the first direction is substantially equal to the second width, and
a maximum width of the overlap area in the second direction is substantially equal to the fourth width.

6. The display device of claim 1, further comprising:
a color filter disposed on the light-transmitting area of the base portion,
wherein the color filter includes the first color pigment.

7. The display device of claim 6,
wherein the first sub-color filter is connected to the color filter.

8. The display device of claim 7,
wherein the second sub-color filter is spaced from the color filter.

9. The display device of claim 1, further comprising:
a color filter disposed on the light-transmitting area of the base portion,
wherein the first sub-color filter and the second sub-color filter are spaced from the color filter.

10. The display device of claim 1, further comprising:
a switching element disposed on the light-blocking area of the base portion, the switching element overlapping the projection portion and the spacing member; and
a passivation layer disposed on the switching element,
wherein the light-blocking member is disposed on the passivation layer, and
the projection portion is disposed between the passivation layer and the light-blocking member.

11. The display device of claim 10, further comprising:
a color filter disposed on the passivation layer and overlapping the light-transmitting area of the base portion; and
a pixel electrode disposed on the color filter and connected to the switching element through a contact hole formed in the passivation layer,
wherein the projection portion does not overlap the contact hole.

12. The display device of claim 11,
wherein the color filter does not overlap the contact hole.

13. The display device of claim 11,
wherein the light-blocking member is partially in direct contact with the passivation layer.

14. A display device, comprising:
a base portion including a first pixel area that includes a first light-transmitting area and a first light-blocking area and a second pixel area that includes a second light-transmitting area and a second light-blocking area;
a projection portion disposed on the first light-blocking area of the base portion, the projection portion including a first sub-color filter and a second sub-color filter overlapping the first sub-color filter;
a third sub-color filter disposed on the second light-blocking area of the base portion;
a first light-blocking member disposed on the projection portion and overlapping the first light-blocking area of the base portion;
a second light-blocking member disposed on the third sub-color filter and overlapping the second light-blocking area of the base portion;
a spacing member disposed on the first light-blocking member, the spacing member being made of the same material as the first light-blocking member and overlapping the projection portion; and
a subsidiary spacing member disposed on the second light-blocking member, the subsidiary spacing member being made of the same material as the second light-blocking member and overlapping the third sub-color filter,
wherein the first sub-color filter includes a first color pigment,
the second sub-color filter includes a second color pigment different from the first color pigment,
a first width of the first sub-color filter in a first direction is different from a second width of the second sub-color filter in the first direction,
a third width of the first sub-color filter in a second direction is different from a fourth width of the second sub-color filter in the second direction,
the second direction is a direction intersecting the first direction, and
a first height of the spacing member measured based on a surface of the base portion is higher than a second height of the subsidiary spacing member measured based on the surface of the base portion.

15. The display device of claim 14,
wherein the spacing member is integrated with the first light-blocking member, and the subsidiary spacing member is integrated with the second light-blocking member.

16. The display device of claim 15,
wherein the first light-blocking member and the second light-blocking member are made of the same material.

17. The display device of claim 16,
wherein the first light-blocking member and the second light-blocking member are integrated with each other.

18. The display device of claim 14,
wherein a first height of the projection portion measured based on the surface of the base portion is higher than a second height of the third sub-color filter member measured based on the surface of the base portion.

19. The display device of claim 14, further comprising:
a first color filter disposed on the first light-transmitting area of the base portion and including the first color pigment; and
a second color filter disposed on the second light-transmitting area of the base portion and including the second color pigment different from the first color pigment,
wherein the third sub-color filter includes a color pigment which is substantially the same as any one of the first color pigment and the second color pigment.

20. The display device of claim 14,
a first color filter disposed on the first light-transmitting area of the base portion and including the first color pigment; and
a second color filter disposed on the second light-transmitting area of the base portion and including a second color pigment different from the first color pigment,
wherein the third sub-color filter includes a third color pigment which is different from the first color pigment and the second color pigment.

21. The display device of claim 14,
a first color filter disposed on the first light-transmitting area of the base portion and including a third color pigment different from the first color pigment and the second color pigment; and
a second color filter disposed on the second light-transmitting area of the base portion and including a color pigment different from the third color pigment,
wherein the third sub-color filter includes a color pigment which is substantially the same as any one of the first color pigment and the second color pigment.

22. The display device of claim 14,
a first color filter disposed on the first light-transmitting area of the base portion and including a third color pigment different from the first color pigment and the second color pigment; and
a second color filter disposed on the second light-transmitting area of the base portion and including a color pigment different from the third color pigment,
wherein the third sub-color filter includes the third color pigment.

23. The display device of claim 14, further comprising:
a first switching element disposed on the first light-blocking area of the base portion, the first switching element overlapping the projection portion and the spacing member;
a second switching element disposed on the second light-blocking area of the base portion, the second switching element overlapping the third sub-color filter and the subsidiary spacing member; and
a passivation layer disposed on the first switching element and the second switching element,
wherein the projection portion is disposed between the passivation layer and the first light-blocking member, and
the third sub-color filter is disposed between the passivation layer and the second light-blocking member,
wherein the first light-blocking member overlaps the first switching element, and the second light-blocking member overlaps the second switching element, and
wherein the first light-blocking member and the second light-blocking member are connected to each other.

24. The display device of claim 23,
wherein the first light-blocking member is partially in direct contact with the passivation layer, and the second light-blocking member is partially in direct contact with the passivation layer.

* * * * *